(12) United States Patent
Takemoto et al.

(10) Patent No.: US 10,391,853 B2
(45) Date of Patent: Aug. 27, 2019

(54) DRIVE DEVICE

(71) Applicant: Nidec Corporation, Kyoto (JP)

(72) Inventors: Shinji Takemoto, Kyoto (JP); Kosuke Mizuike, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/121,676

(22) Filed: Sep. 5, 2018

(65) Prior Publication Data

US 2019/0084406 A1   Mar. 21, 2019

Related U.S. Application Data

(60) Provisional application No. 62/559,019, filed on Sep. 15, 2017.

(30) Foreign Application Priority Data

Mar. 26, 2018   (JP) .................................. 2018-058831

(51) Int. Cl.
  *H02K 5/10* (2006.01)
  *H02K 1/27* (2006.01)
  (Continued)

(52) U.S. Cl.
  CPC .......... *B60K 7/0007* (2013.01); *B60K 17/046* (2013.01); *H02K 1/146* (2013.01);
  (Continued)

(58) Field of Classification Search
  CPC ................ B60K 7/0007; B60K 17/046; B60K 2007/0092; B60K 2007/0038;
  (Continued)

(56) References Cited

U.S. PATENT DOCUMENTS 5,691,584 A * 11/1997 Toida ................... B60K 7/0007
                                                         180/65.51
5,901,801 A *  5/1999 Toida ..................... H02K 7/116
                                                         180/65.1
(Continued)

FOREIGN PATENT DOCUMENTS

EP   0 799 737 A1   10/1997
GB   1 341 825 A    12/1973
(Continued)

OTHER PUBLICATIONS

Takemoto et al., "Drive Device", U.S. Appl. No. 16/121,677, filed Sep. 5, 2018.
(Continued)

*Primary Examiner* — Erez Gurari
(74) *Attorney, Agent, or Firm* — Keating & Bennett, LLP

(57) ABSTRACT

A planetary gear mechanism includes a sun gear, planetary gears, an annular internal gear, a carrier that is fixed to a bracket and includes a second lid, and a support shaft. An output unit is supported to be rotatable by a first bearing attached to the support shaft and a second bearing attached to the bracket, and fixed to the internal gear. The bracket includes a protrusion protruding from a first lid to one side in the axial direction. A radially inside surface of the protrusion includes a first curved surface extending in a circumferential direction as viewed along the axial direction. The carrier includes a second curved surface located radially inside the first curved surface. The second curved surface extends in the circumferential direction as viewed along the axial direction, and contacts with the first curved surface.

10 Claims, 13 Drawing Sheets

(51) Int. Cl.
*H02K 5/173* (2006.01)
*H02K 5/15* (2006.01)
*B60K 7/00* (2006.01)
*B60K 17/04* (2006.01)
*H02K 7/116* (2006.01)
*H02K 1/14* (2006.01)
*H02K 11/215* (2016.01)
*H02K 11/33* (2016.01)

(52) U.S. Cl.
CPC ............ *H02K 1/276* (2013.01); *H02K 5/1732* (2013.01); *H02K 7/116* (2013.01); *B60K 2007/0038* (2013.01); *B60K 2007/0092* (2013.01); *B60L 2200/12* (2013.01); *B60L 2220/44* (2013.01); *B60L 2240/421* (2013.01); *H02K 5/10* (2013.01); *H02K 5/15* (2013.01); *H02K 11/215* (2016.01); *H02K 11/33* (2016.01); *H02K 2203/03* (2013.01)

(58) Field of Classification Search
CPC .......... H02K 5/1732; H02K 5/10; H02K 5/15; H02K 1/276; H02K 1/146; H02K 7/116; H02K 11/33; H02K 11/215; H02K 2203/03; B60L 2240/421; B60L 2200/12; B60L 2220/44
See application file for complete search history.

(56) References Cited

U.S. PATENT DOCUMENTS

| | | | | |
|---|---|---|---|---|
| 6,276,475 | B1 * | 8/2001 | Nakanosono | B62M 6/65 180/65.8 |
| 6,492,742 | B1 * | 12/2002 | Fujikawa | B60K 6/26 290/40 C |
| 6,561,336 | B1 * | 5/2003 | Huart | F02B 63/04 192/70.252 |
| 7,357,743 | B2 * | 4/2008 | Mao | H02K 1/146 180/65.7 |
| 7,530,416 | B2 | 5/2009 | Suzuki | |
| 8,950,531 | B2 * | 2/2015 | Urabe | B62M 6/65 180/205.1 |
| 9,017,201 | B2 * | 4/2015 | Hino | B62M 11/04 475/5 |
| 9,855,992 | B1 * | 1/2018 | Liang | B60K 7/0007 |
| 9,976,630 | B2 * | 5/2018 | Luk | B62M 9/06 |
| 2005/0264112 | A1 * | 12/2005 | Tanaka | B60B 27/02 310/75 C |
| 2008/0106163 | A1 * | 5/2008 | Mizuno | B60L 50/16 310/83 |
| 2008/0308336 | A1 * | 12/2008 | van Rooij | B62M 6/65 180/206.6 |
| 2010/0170731 | A1 * | 7/2010 | Jordan | B62M 6/65 180/65.7 |
| 2011/0303471 | A1 | 12/2011 | Urabe et al. | |
| 2012/0025677 | A1 * | 2/2012 | Adachi | B62M 6/65 310/67 R |
| 2012/0074820 | A1 * | 3/2012 | Takeuchi | H02K 7/116 310/75 R |
| 2012/0129642 | A1 * | 5/2012 | Palfai | F16H 57/082 475/149 |
| 2013/0009450 | A1 * | 1/2013 | Suzuki | B60K 7/0007 301/6.5 |
| 2013/0049439 | A1 * | 2/2013 | Yamada | B60B 7/00 301/6.5 |
| 2013/0049549 | A1 * | 2/2013 | Folmli | B62M 6/65 310/67 A |
| 2013/0284527 | A1 * | 10/2013 | Murakami | B60L 7/18 180/55 |
| 2013/0288841 | A1 * | 10/2013 | Yoshino | B60K 7/0007 475/149 |
| 2013/0325239 | A1 * | 12/2013 | Ozaki | B60T 7/12 701/22 |
| 2016/0068054 | A1 * | 3/2016 | Abe | B60B 27/0015 180/65.51 |
| 2016/0238108 | A1 * | 8/2016 | Kanai | F16H 1/36 |
| 2016/0248293 | A1 * | 8/2016 | Takeno | B60K 6/445 |
| 2017/0001513 | A1 * | 1/2017 | Kuroda | B60K 17/14 |
| 2017/0334516 | A1 * | 11/2017 | Ferguson | B62M 6/65 |
| 2018/0056774 | A1 * | 3/2018 | Chan | B60K 7/0007 |
| 2018/0109222 | A1 * | 4/2018 | Suzuki | H02P 29/60 |
| 2018/0342927 | A1 * | 11/2018 | Okada | H02K 7/116 |
| 2019/0084406 | A1 * | 3/2019 | Takemoto | B60K 7/0007 |
| 2019/0084407 | A1 * | 3/2019 | Takemoto | B60K 7/0007 |
| 2019/0084408 | A1 * | 3/2019 | Mizuike | B60K 7/0007 |

FOREIGN PATENT DOCUMENTS

| | | |
|---|---|---|
| JP | 2000-83349 A | 3/2000 |
| JP | 2015-110382 A | 6/2015 |

OTHER PUBLICATIONS

Mizuike et al., "Drive Device", U.S. Appl. No. 16/121,678, filed Sep. 5, 2018.

* cited by examiner

DRIVE DEVICE

CROSS REFERENCE TO RELATED APPLICATIONS

This application claims the benefit of priority to U.S. patent application Ser. No. 62/559,019 filed on Sep. 15, 2017 and Japanese Patent Application No. 2018-058831 filed on Mar. 26, 2018. The entire contents of these applications are hereby incorporated herein by reference.

BACKGROUND OF THE INVENTION

1. Field of the Invention

The present disclosure relates to a drive device.

2. Description of the Related Art

In a drive device that rotates a wheel, a configuration including a planetary gear mechanism is known.

An output unit of the drive device is supported by a bearing attached to the planetary gear mechanism and a bearing attached to a bracket of a motor, in some cases.

In this case, when assembly accuracy of the planetary gear mechanism and the bracket is low, there is a problem in that axial accuracy between the bearings is degraded to degrade axial accuracy of the output unit.

SUMMARY OF THE INVENTION

An exemplary embodiment of the present disclosure is a drive device that rotates a wheel and includes a motor including a motor shaft disposed along a center axis; a planetary gear mechanism connected to one side in an axial direction of the motor shaft; and an output unit to which rotation of the motor shaft is transmitted through the planetary gear mechanism. The motor includes a rotor including the motor shaft, a stator opposed to the rotor in a radial direction with a gap interposed therebetween, and a bracket including a first lid covering one side in the axial direction of the stator. The planetary gear mechanism includes a sun gear, a plurality of planetary gears, an annular internal gear, a carrier, and a support shaft. The sun gear is provided in a portion on one side in the axial direction of the motor shaft. The plurality of planetary gears are arranged along a circumferential direction on one side in the axial direction of the first lid and engage with the sun gear. The internal gear surrounds a radial outer periphery of the plurality of planetary gears and engages with the planetary gears. The carrier includes a second lid located on one side in the axial direction of the planetary gear, and is fixed to the bracket. The support shaft is attached to the carrier to extend from the carrier to one side in the axial direction along the center axis. The output unit is supported to be rotatable about the center axis by the first bearing attached to the support shaft and the second bearing attached to the bracket, and fixed to the internal gear. The bracket includes a protrusion protruding from the first lid to one side in the axial direction. A radially inside surface of the protrusion includes a first curved surface extending in the circumferential direction as viewed along the axial direction. The carrier includes a second curved surface located radially inside the first curved surface. The second curved surface extends in the circumferential direction as viewed along the axial direction, and contacts with the first curved surface.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

A Z-axis direction appropriately illustrated in each drawing is a vertical direction. An X-axis direction and a Y-axis direction are a horizontal direction orthogonal to the Z-axis direction, and are orthogonal to each other.

In an embodiment, the X-axis direction is a right-left direction of a traveling body on which a drive device 10 of the embodiment is mounted. In the embodiment, the Y-axis direction is a front-rear direction of the traveling body on which the drive device 10 of the embodiment is mounted.

A center axis J appropriately illustrated in each drawing is an imaginary line extending in a direction parallel to the X-axis direction which is the right-left direction. Hereinafter, a direction parallel to an axial direction of the center axis J is simply referred to as an axial direction X, a positive side of the axial direction X is referred to as a right side, and a negative side of the axial direction X is referred to as a left side. A radial direction centered on the center axis J is simply referred to as a radial direction, and a circumferential direction centered on the center axis J is simply referred to as a circumferential direction. A direction parallel to the Z-axis direction that is the vertical direction is referred to as a vertical direction Z. The positive side of the vertical direction Z is referred to as an upper side, and the negative side of the vertical direction Z is referred to as a lower side.

In the embodiment, the right side corresponds to one side in the axial direction, and the left side corresponds to the other side in the axial direction. The vertical direction, the upper side, the lower side, the horizontal direction, and the right-left direction are merely names for describing a relative positional relationship between the respective units, and an actual arrangement relationship and the like may be other than the arrangement relationship indicated by these names.

Figure 1:
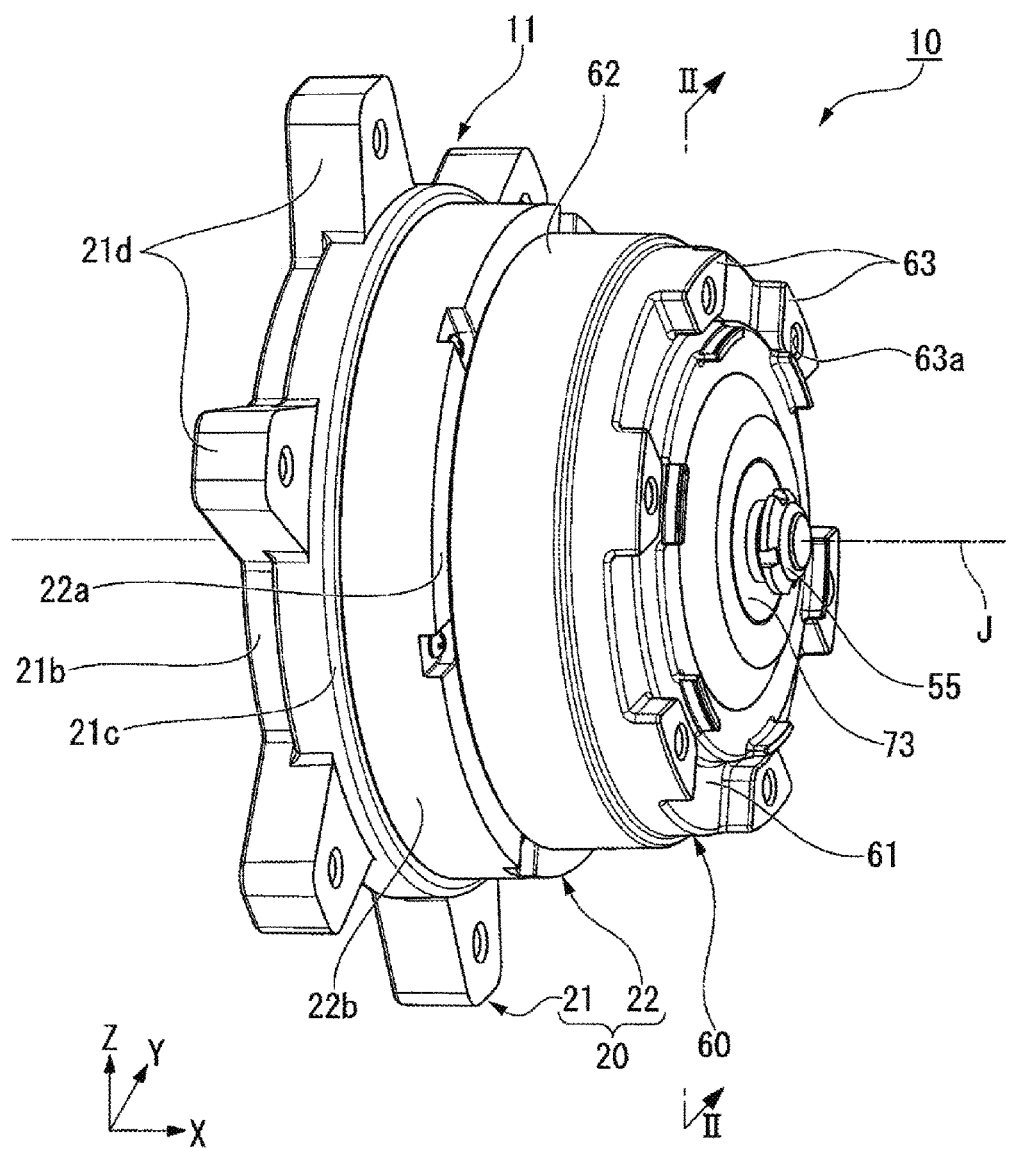
FIG. 1 is a perspective view illustrating a drive device according to an exemplary embodiment of the present disclosure.
Figure 2:
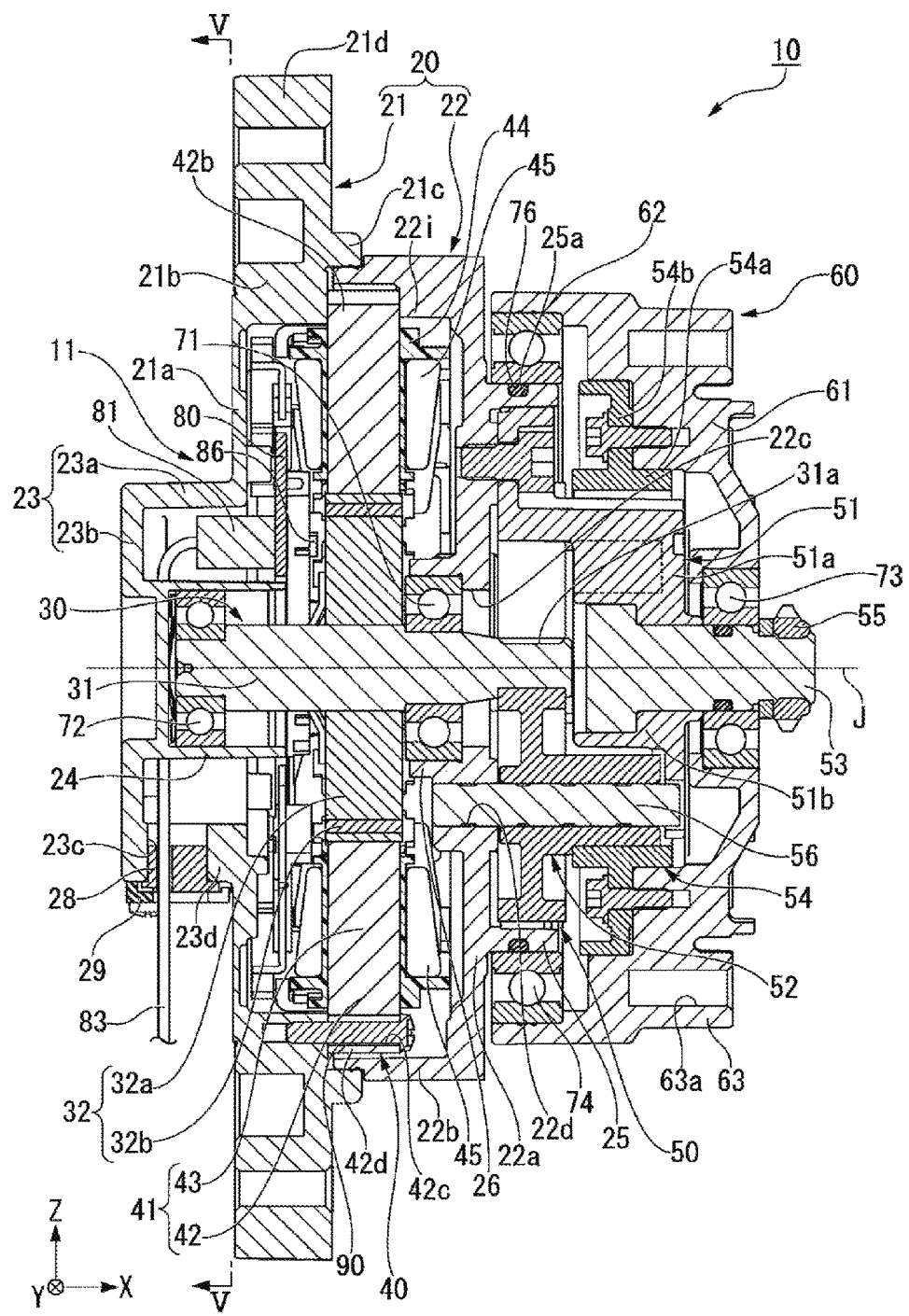
FIG. 2 is a sectional view illustrating the drive device of the exemplary embodiment of FIG. 1, and is a sectional view taken along a line II-II in FIG. 1.
Figure 3:
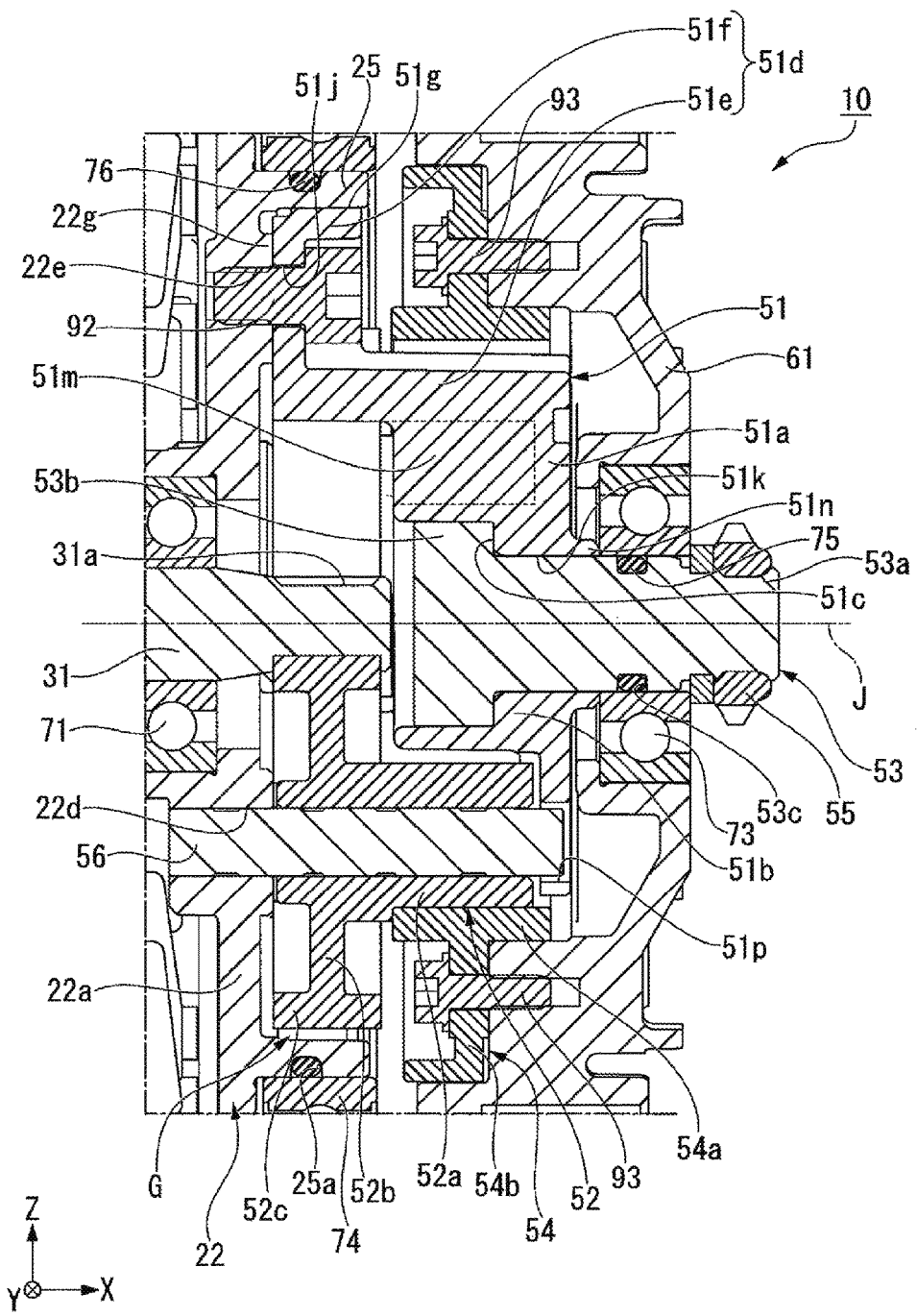
FIG. 3 is a sectional view illustrating a portion of the drive device of the exemplary embodiment of FIG. 1, and is a partially enlarged view of FIG. 2.

The drive device 10 of the embodiment in FIGS. 1 to 3 is a drive device that rotates a wheel. In the embodiment, the drive device 10 is mounted on the traveling body having the wheel (not illustrated). The drive device 10 is fixed to a chassis of the traveling body. Although not illustrated, the chassis of the traveling body is located on the left side of the drive device 10.

As illustrated in FIGS. 2 and 3, the drive device 10 of the embodiment includes a motor 11 including a motor shaft 31 arranged along the center axis J, a planetary gear mechanism 50, an output unit 60, a first bearing 73, a second bearing 74, a first seal member 75, and a second seal member 76. The planetary gear mechanism 50 is a speed reduction mechanism connected to the right side of the motor shaft 31. The output unit 60 is located on the right side of the motor 11. The rotation of the motor shaft 31 is transmitted to the output unit 60 through the planetary gear mechanism 50. The first bearing 73 and the second bearing 74 support the output unit 60 while the output unit 60 is rotatable about the center axis J. For example, the first bearing 73 and the second bearing 74 are ball bearings.

As illustrated in FIG. 2, the motor 11 includes a housing 20, a bush 28, a rubber cover 29, a rotor 30 including the motor shaft 31, a first motor bearing 71, a second motor bearing 72, a stator 40, a circuit board 80, a rotation sensor 86, a connector 81, and a cable 83.

The rotor 30 and the stator 40 are accommodated in the housing 20. In the embodiment, for example, an inside of the housing 20 is sealed. The housing 20 includes a cover member 21 and a bracket 22. The cover member 21 is fixed to the left side of the bracket 22. The cover member 21 includes a cover bottom 21a, a cover cylinder 21b, a fitting cylinder 21c, a first fixing unit 21d, a protruding cylinder 23, and a bearing holder 24. That is, the housing 20 includes the cover bottom 21a, the cover cylinder 21b, the fitting cylinder 21c, the first fixing unit 21d, the protruding cylinder 23, and the bearing holder 24.

The cover bottom 21a is formed into an annular plate shape surrounding the center axis J. A plate surface of the cover bottom 21a is oriented toward the axial direction X. The cover bottom 21a covers the left side of the stator 40. The cover cylinder 21b has a cylindrical shape, and protrudes rightward from a radially outer circumferential edge of the cover bottom 21a. The fitting cylinder 21c has a cylindrical shape, and protrudes rightward from an end face on the right side of the cover cylinder 21b. In the embodiment, the fitting cylinder 21c has the cylindrical shape centered on the center axis J.

The first fixing unit 21d is a portion fixed to the chassis of the traveling body on which the drive device 10 is mounted. The first fixing unit 21d is fixed to the chassis of the traveling body by, for example, a screw. As illustrated in FIG. 1, the first fixing unit 21d protrudes radially outward from the cover cylinder 21b. In the embodiment, a plurality of first fixing units 21d are provided. The plurality of first fixing units 21d are arranged at equal intervals over an entire circumference along the circumferential direction. In the embodiment, a dimension in the circumferential direction of the first fixing unit 21d decreases toward the radial outside. As illustrated in FIG. 2, in the embodiment, the dimension in the axial direction X of the first fixing unit 21d is substantially identical to the dimension in the axial direction X of the cover cylinder 21b.

In the embodiment, the first fixing unit 21d is provided in the cover member 21 located on the left side in the cover member 21 and the bracket 22. In the embodiment, the housing 20 includes the first fixing unit 21d on the left side. The first fixing unit 21d is located on the right side of the second motor bearing 72.

The protruding cylinder 23 is a portion protruding to the left side of the housing 20. The protruding cylinder 23 includes a cylinder main body 23a and a bottom 23b. The cylinder main body 23a has a cylindrical shape protruding leftward from the radially inner circumferential edge of the cover bottom 21a. An end on the left side of the motor shaft 31 is inserted in the cylinder main body 23a. Consequently, the protruding cylinder 23 covers at least a portion of the motor shaft 31 on the left side of a rotor main body 32 (to be described later).

Figure 4:
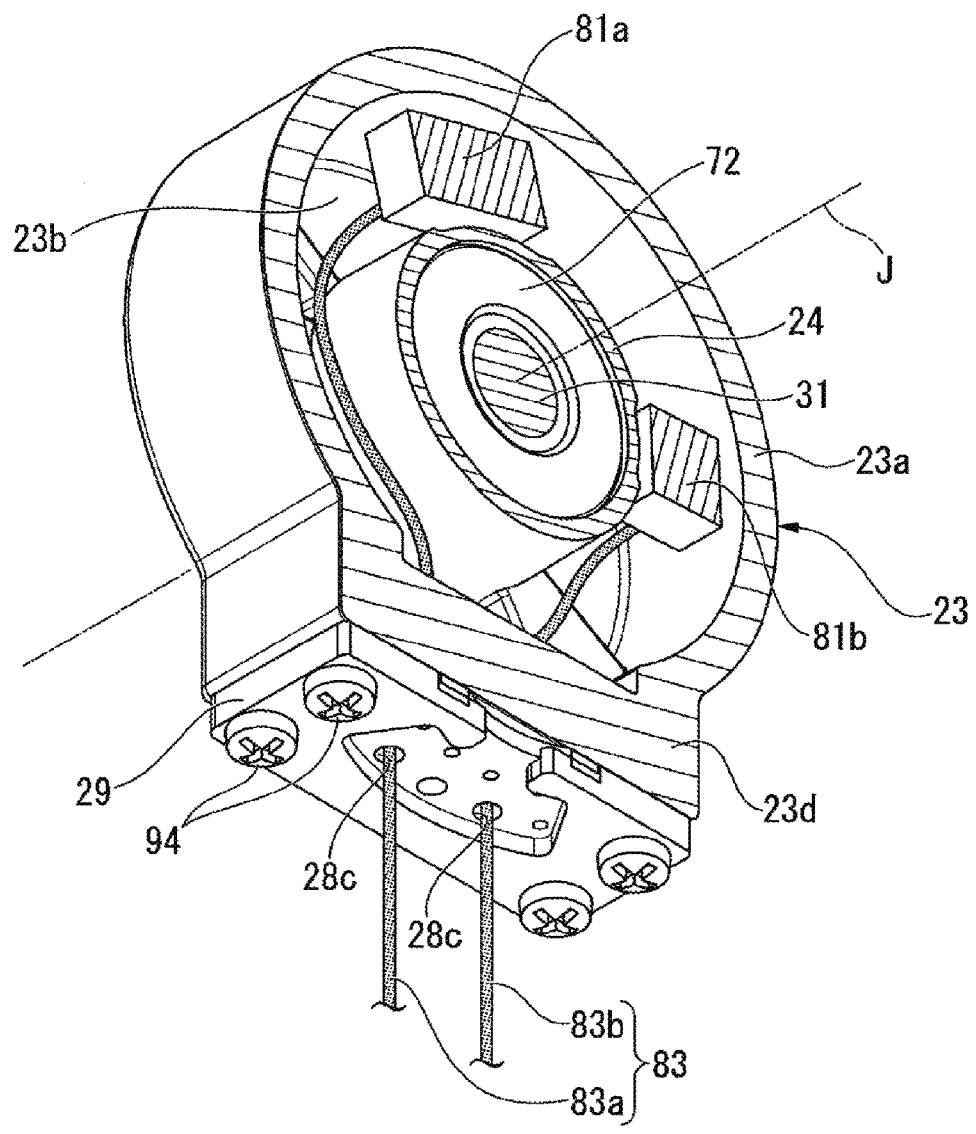
FIG. 4 is a partially sectional perspective view illustrating a portion of a drive device of an exemplary embodiment of the present disclosure.
Figure 5:
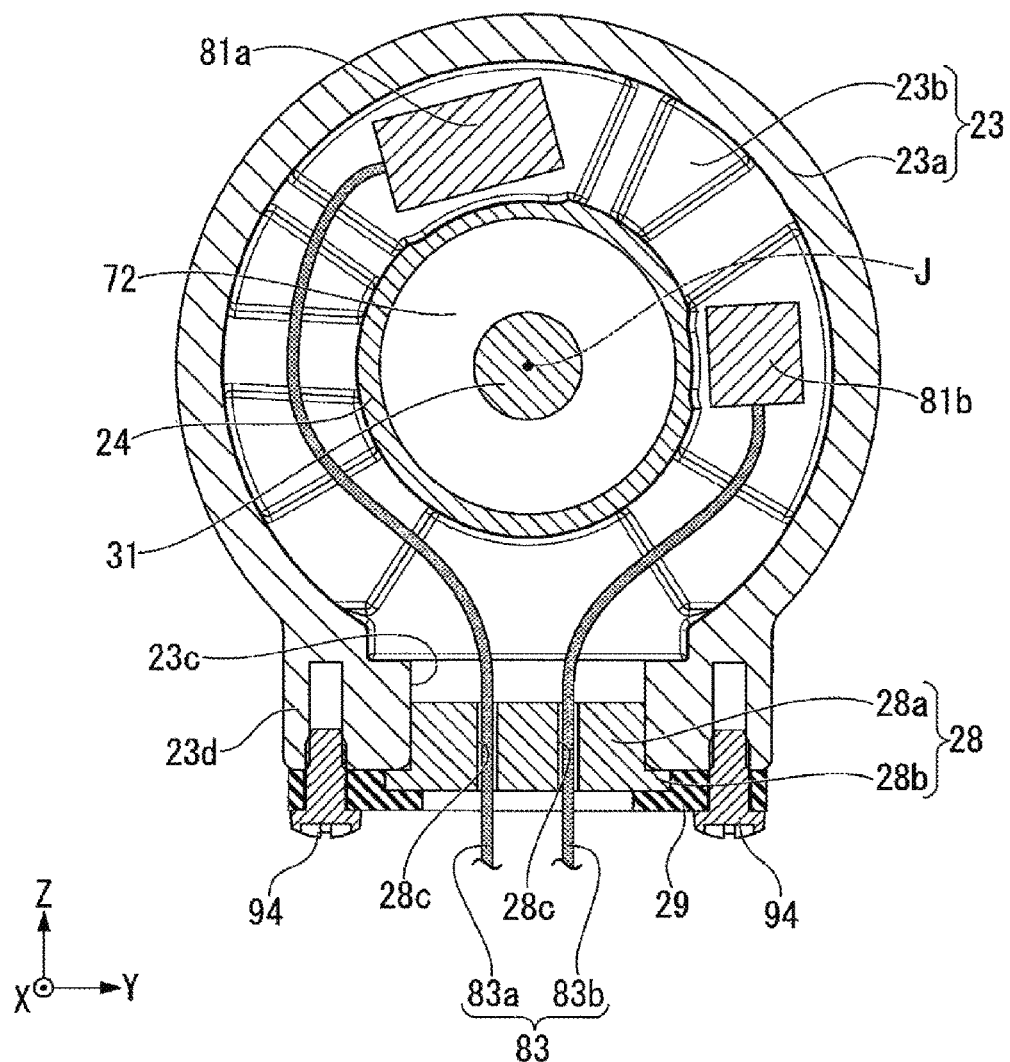
FIG. 5 is a sectional view illustrating a portion of a drive device of an exemplary embodiment of the present disclosure, and is a sectional view taken along a line V-V in FIG. 2.

As illustrated in FIGS. 4 and 5, in the embodiment, the cylinder main body 23a has a substantially cylindrical shape centered on the center axis J. The cylinder main body 23a includes a projection 23d projecting radially outward. In the embodiment, the projection 23d projects downward. The projection 23d is formed into a substantially rectangular shape as viewed in the axial direction X.

As illustrated in FIG. 5, the projection 23d includes an extraction hole 23c penetrating a wall on the lower side of the projection 23d in the vertical direction Z in the radial direction. That is, the protruding cylinder 23 includes the extraction hole 23c radially penetrating the wall of the protruding cylinder 23. The bush 28 is fitted in the extraction hole 23c.

The bush 28 closes an opening on the radial outside of the extraction hole 23c, that is, the lower-side opening in the embodiment. The bush 28 includes a bush main body 28a and a bush flange 28b. The bush main body 28a is a portion fitted in the extraction hole 23c. The bush flange 28b expands in a direction orthogonal to the vertical direction Z from a lower end of the bush main body 28a. The bush flange 28b contacts with the circumferential edge of the extraction hole 23c in the lower end face of the projection 23d. The bush 28 includes a plurality of bush through-holes 28c radially penetrating the bush 28. In the embodiment, the bush through-hole 28c penetrates the bush 28 in the vertical direction Z.

The bush 28 is fixed to the protruding cylinder 23 by the rubber cover 29. As illustrated in FIG. 4, the rubber cover 29 has a substantially C-shape opened to the right side as viewed in the vertical direction Z. The rubber cover 29 is fixed to the lower end of the projection 23d by the screw 94. Consequently, the rubber cover 29 is fixed to the radially outside surface of the protruding cylinder 23. As illustrated in FIG. 5, the rubber cover 29 covers a gap between the extraction hole 23c and the bush 28 from the radial outside. Consequently, moisture or the like can be prevented from entering the inside of the protruding cylinder 23 from the gap between the extraction hole 23c and the bush 28. In the embodiment, the extraction hole 23c is opened to the lower side, so that the moisture or the like can be further prevented from entering the inside of the protruding cylinder 23.

The inner edge of the rubber cover 29 contacts with the surface on the lower side of the bush flange 28b. The inner edge of the rubber cover 29 presses the bush flange 28b against the surface on the lower side of the projection 23d. Consequently, the bush 28 is fixed to the projection 23d.

As illustrated in FIG. 2, the bottom 23b expands radially to cover the left side of the motor shaft 31. The radially outer circumferential edge of the bottom 23b is connected to the end on the left side of the cylinder main body 23a. The bottom 23b closes the opening on the left side of the cylinder main body 23a.

The bearing holder 24 has a cylindrical shape protruding rightward from the bottom 23b. As illustrated in FIGS. 4 and 5, in the embodiment, the bearing holder 24 has a cylindrical shape centered on the center axis J. The bearing holder 24 is located radially inside the protruding cylinder 23. As illustrated in FIG. 2, the left side of the bearing holder 24 is located inside the protruding cylinder 23. The end on the right side of the bearing holder 24 protrudes to the right side of the protruding cylinder 23. In the embodiment, the end on the right side of the bearing holder 24 is located on the right side of the surface on the left side of the circuit board 80 (to be described later).

The bearing holder 24 holds the second motor bearing 72. More particularly, the bearing holder 24 holds the second motor bearing 72 on the inner circumferential surface. Consequently, the cover member 21 holds the second motor bearing 72. As illustrated in FIG. 2, in the embodiment, the second motor bearing 72 is located at the end on the left side in the bearing holder 24. The end on the left side of the motor shaft 31 is inserted in the bearing holder 24.

Figure 6:
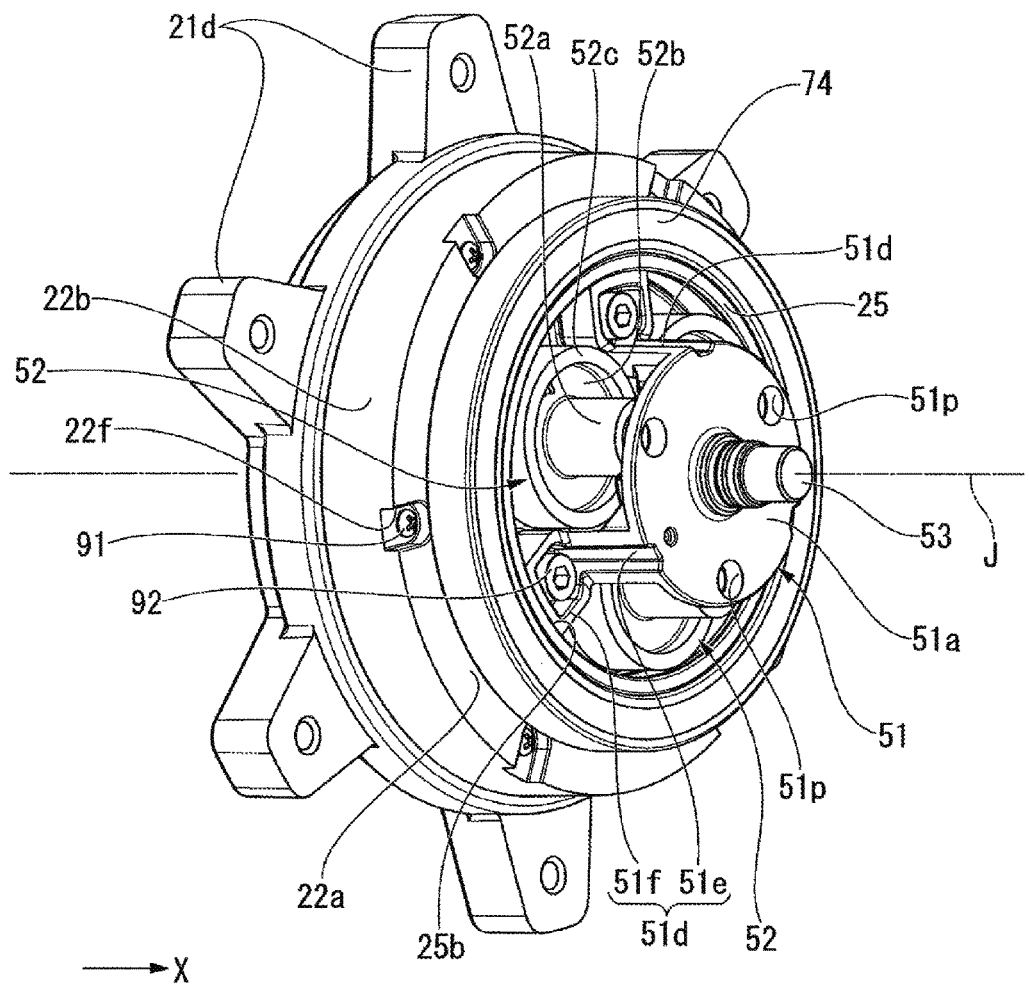
FIG. 6 is a perspective view illustrating a portion of a drive device of an exemplary embodiment of the present disclosure.
Figure 7:
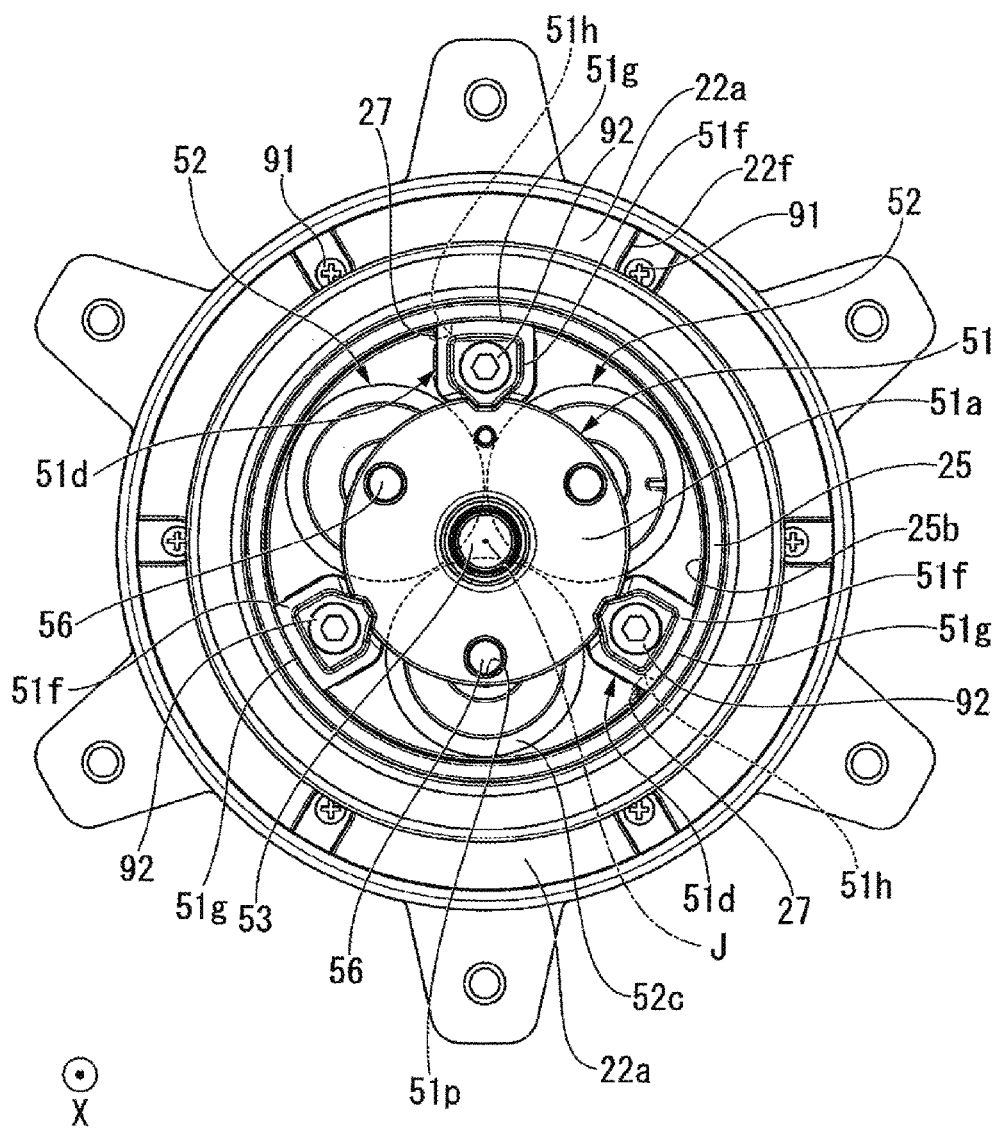
FIG. 7 is a view illustrating a portion of a drive device of an exemplary embodiment of the present disclosure as viewed from a right side.

The bracket 22 is fixed to the right side of the cover member 21. The bracket 22 includes a first lid 22a, a bracket cylinder 22b, a third fixing unit 22i, a protrusion 25, and a holder 26. The first lid 22a expands radially to cover the right side of the stator 40. As illustrated in FIGS. 6 and 7, an outer shape of the first lid 22a is a circular shape centered on the center axis J as viewed along the axial direction X.

As illustrated in FIG. 2, the first lid portion 22a includes a motor shaft insertion hole 22c penetrating the first lid 22a in the axial direction X. For example, the motor shaft insertion hole 22c is a circular shape centered on the center axis J. The motor shaft 31 is passed through the motor shaft insertion hole 22c. The first lid 22a includes a first hole 22d recessed on the left side. In the embodiment, the first hole 22d penetrates the first lid 22a in the axial direction X. The first hole 22d is located radially outside the motor shaft insertion hole 22c. For example, the first hole 22d has a circular shape. Although not illustrated, in the embodiment, three first holes 22d are provided at equal intervals over an entire circumference along the circumferential direction.

As illustrated in FIG. 6, the first lid 22a includes a recess 22f recessed from the surface on the right side of the first lid 22a to the left side. The recess 22f is opened radially outward. A plurality of recesses 22f are provided along the circumferential direction. The plurality of recesses 22f are arranged at equal intervals over an entire circumference along the circumferential direction.

Figure 8:
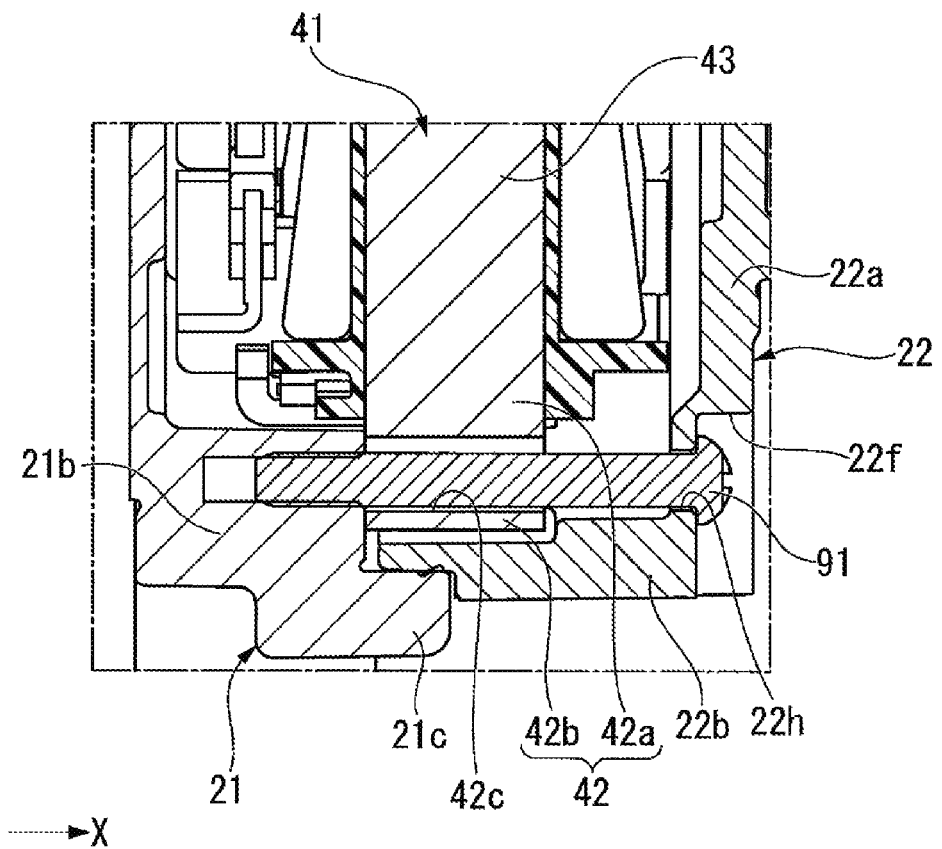
FIG. 8 is a sectional view illustrating a portion of a drive device of an exemplary embodiment of the present disclosure.

As illustrated in FIG. 8, the first lid 22a includes a through-hole 22h penetrating the first lid 22a in the axial direction X. In the embodiment, the through-hole 22h penetrates the first lid 22a from a bottom surface of the recess 22f to the surface on the left side of the first lid 22a. A screw 91 is passed through the through-hole 22h from the right side. The screw 91 is fastened in the cover member 21 through the through-hole 22h and a through-hole 42c of a core projection 42b (to be described later). In the embodiment, the screw 91 is tightened in a female screw hole provided on the end face on the right side of the cover cylinder 21b. Consequently, the first lid 22a is fixed to the cover cylinder 21b, and the bracket 22 is fixed to the cover member 21.

The bracket cylinder 22b has a cylindrical shape extending leftward from the radially outer circumferential edge of the first lid 22a. As illustrated in FIG. 5, in this embodiment, the bracket cylinder 22b has a cylindrical shape centered on the center axis J. As illustrated in FIG. 2, the end on the left side of the bracket cylinder 22b is fitted in the radial inside of the fitting cylinder 21c.

The third fixing unit 22i protrudes radially inward from a right-side portion of the inner circumferential surface of the bracket cylinder 22b. The end on the right side of the third fixing unit 22i is connected to the first lid 22a. The end on the left side of the third fixing unit 22i is located on the right side of the end on the left side of the bracket cylinder 22b. The third fixing unit 22i overlaps a portion radially inside the fitting cylinder 21c in the cover cylinder 21b as viewed in the axial direction X. Although not illustrated, a plurality of third fixing units 22i are provided along the circumferential direction.

The protrusion 25 protrudes rightward from the first lid 22a. As illustrated in FIGS. 6 and 7, in this embodiment, the protrusion 25 has a cylindrical shape centered on the center axis J. As illustrated in FIG. 2, the protrusion 25 is located radially outside the first hole 22d. An outer diameter and an inner diameter of the protrusion 25 are smaller than an outer diameter and an inner diameter of the bracket cylinder 22b, and are larger than an outer diameter and an inner diameter of the protruding cylinder 23. The second bearing 74 is attached to the protrusion 25. That is, in the embodiment, the second bearing 74 is attached to the bracket 22. Consequently, the second bearing 74 is attached to the housing 20. More particularly, the second bearing 74 is fitted in and fixed to the outer circumferential surface of the protrusion 25.

The protrusion 25 includes a groove 25a recessed radially inward from the outer circumferential surface of the protrusion 25. Although not illustrated, the groove 25a has an annular shape, and is provided over the entire circumference of the outer circumferential surface of the protrusion 25. The groove 25a is provided in a portion to which the second bearing 74 is fixed in the outer circumferential surface of the protrusion 25. An annular second seal member 76 is fitted in the groove 25a. The second seal member 76 seals a gap between the inner circumferential surface of an inner ring of the second bearing 74 and the outer circumferential surface of the protrusion 25. That is, the second seal member 76 seals the gap between the second bearing 74 and the housing 20. Consequently, the moisture or the like can be prevented from entering the inside of the output unit 60. In the embodiment, for example, the second seal member 76 is an O-ring.

As illustrated in FIGS. 6 and 7, a radially inside surface of the protrusion 25 includes a first curved surface 25b. In the embodiment, the first curved surface 25b is a whole of the radially inside surface of the protrusion 25. The first curved surface 25b extends circumferentially as viewed in the axial direction X. In the embodiment, the first curved surface 25b has a circular shape centered on the center axis J as viewed in the axial direction X. For example, the first curved surface 25b is a cutting surface formed by cutting.

As illustrated in FIG. 2, the holder 26 has a cylindrical shape protruding leftward from the circumferential edge of the motor shaft insertion hole 22c in the surface on the left side of the first lid 22a. In the embodiment, the holder 26 has a cylindrical shape centered on the center axis J. The holder 26 holds the first motor bearing 71 on the radial inside. Consequently, the bracket 22 holds the first motor bearing 71.

Figure 9:
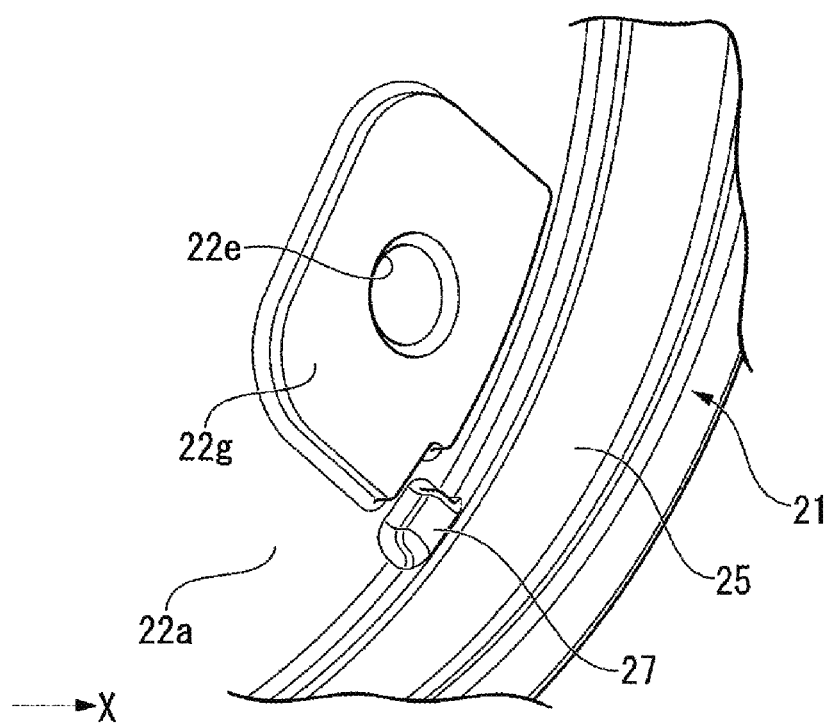
FIG. 9 is a perspective view illustrating a portion of a cover member of an exemplary embodiment of the present disclosure.

As illustrated in FIG. 9, the bracket 22 further includes a support 22g and a positioning unit 27. The support 22g protrudes rightward from a radially outer edge of a portion radially inside the protrusion 25 in the surface on the right side of the first lid 22a. The support 22g has a substantially rectangular shape as viewed in the axial direction X. The surface on the right side of the support 22g is a flat surface orthogonal to the axial direction X. Although not illustrated, three supports 22g are provided at equal intervals over an entire circumference along the circumferential direction. A female screw hole 22e recessed on the left side is provided in each support 22g. As illustrated in FIG. 3, in the embodiment, the female screw hole 22e penetrates the first lid 22a in the axial direction X.

As illustrated in FIG. 9, the positioning unit 27 protrudes rightward from the surface on the right side of the first lid 22a. The positioning unit 27 is located radially inside the protrusion 25. The positioning unit 27 is located radially outside the circumferential end of the support 22g. The positioning unit 27 is connected to the inner circumferential surface of the protrusion 25. As illustrated in FIG. 7, in this embodiment, two protrusions 25 are provided with an interval in the circumferential direction.

As illustrated in FIG. 2, the rotor 30 has a motor shaft 31 and a rotor main body 32. The motor shaft 31 has a columnar shape that extends in the axial direction X while being centered on the center axis J. The motor shaft 31 extends rightward from the inside of the protruding cylinder 23, and protrudes to the outside of the housing 20 through the motor shaft insertion hole 22c. The motor shaft 31 is rotatably supported by the first motor bearing 71 and the second motor bearing 72.

The rotor main body 32 is fixed to the outer circumferential surface of the motor shaft 31. In the embodiment, the rotor main body 32 is located radially inside the bracket cylinder 22b. The rotor main body 32 includes a rotor core 32a and a rotor magnet 32b. That is, the rotor 30 includes the rotor core 32a and the rotor magnet 32b. The rotor core 32a is fixed to the outer circumferential surface of the motor shaft 31. The rotor magnet 32b is fixed to the rotor core 32a. In the embodiment, the rotor magnet 32b is fitted in and fixed to a hole penetrating the rotor core 32a in the axial direction X.

For example, the first motor bearing 71 and the second motor bearing 72 are ball bearings. The motor shaft 31 is rotatably supported by the first motor bearing 71 on the right side of the rotor core 32a. The motor shaft 31 is rotatably supported by the first motor bearing 71 on the left side of a planetary gear 52 (to be described later). For this reason, as compared with the case that the first motor bearing 71 is disposed on the right side of the planetary gear 52, the drive device 10 can easily be downsized in the axial direction X. The first motor bearing 71 is fitted in the radial inside of the holder 26. In the embodiment, the first motor bearing 71 overlaps the planetary gear 52 as viewed in the axial direction X.

The motor shaft 31 is rotatably supported by the second motor bearing 72 on the left side of the rotor core 32a. That is, in the motor shaft 31, a portion on the left side of the rotor main body 32 is rotatably supported by the second motor bearing 72. The second motor bearing 72 is fitted in the radial inside of the bearing holder 24.

The stator 40 is radially opposed to the rotor 30 with a gap interposed therebetween. In the embodiment, the stator 40 surrounds the rotor 30 on the radial outside of the rotor 30. The stator 40 includes a stator core 41, an insulator 44, and a plurality of coils 45.

Figure 10:
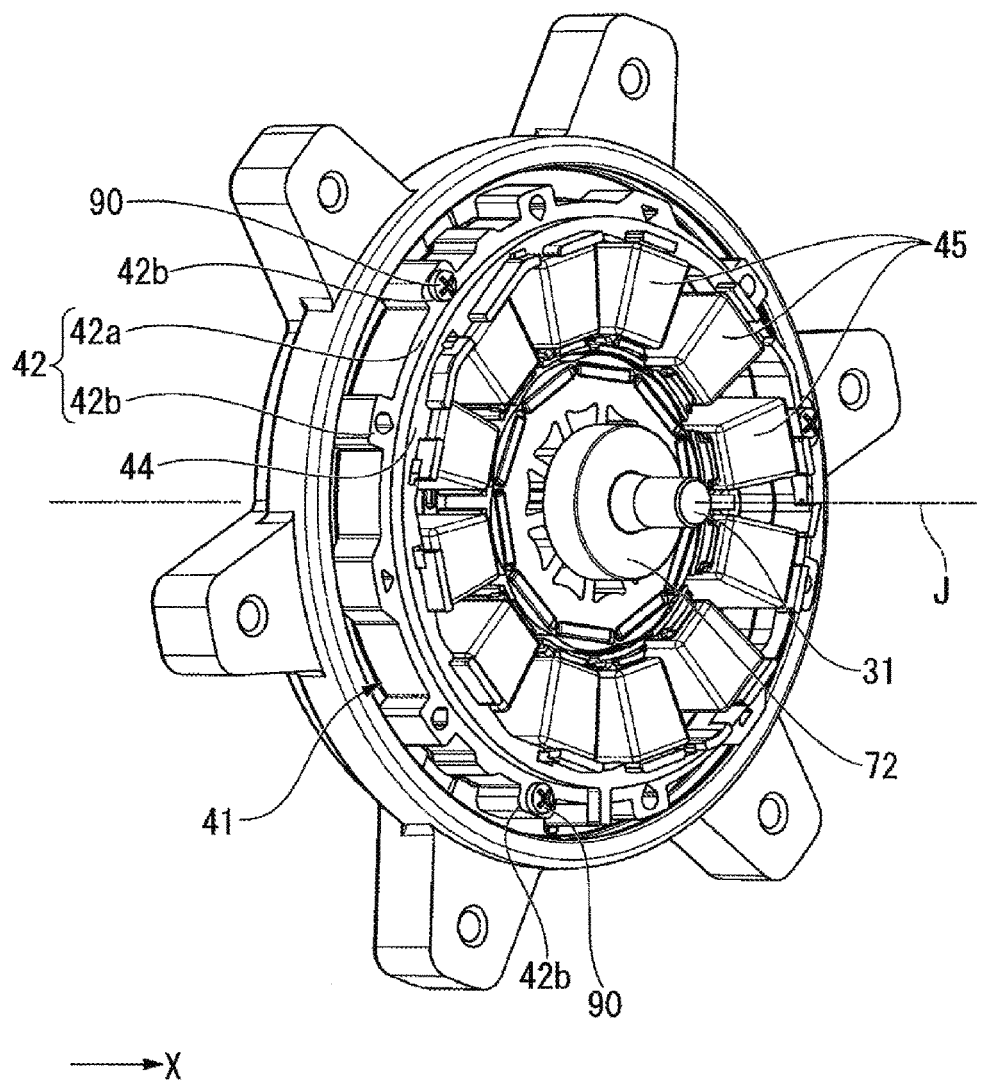
FIG. 10 is a perspective view illustrating a portion of a drive device of an exemplary embodiment of the present disclosure.

The stator core 41 is located radially inside the bracket cylinder 22b. The stator core 41 includes a core back 42 and a plurality of teeth 43. The core back 42 is an annular shape along the circumferential direction. As illustrated in FIG. 10, the core back 42 includes a core-back main body 42a and a core projection 42b. That is, the stator core 41 includes the core-back main body 42a and the core projection 42b. In the embodiment, the core-back main body 42a has an annular shape centered on the center axis J.

The core projection 42b protrudes radially outward from the core-back main body 42a. In the embodiment, a plurality of core projections 42b are provided. The plurality of core projections 42b are arranged at equal intervals over an entire circumference along the circumferential direction. As illustrated in FIG. 2, the core projection 42b includes a through-hole 42c penetrating the core projection 42b in the axial direction X.

The surface on the left side of the core projection 42b contacts directly with the surface oriented toward the right side of the cover member 21. In the embodiment, the surface on the left side of the core projection 42b contacts directly with the end face on the right side of the cover cylinder 21b. That is, the stator core 41 contacts directly with the housing 20. For this reason, heat generated in the plurality of coils 45 is easily dissipated from the stator core 41 to the housing 20. The heat dissipated to the housing 20 is dissipated to the chassis of the traveling body through the first fixing unit 21d. Thus, the heat generated in the coil 45 can be suitably released to the chassis of the traveling body. As described above, according to the embodiment, the heat dissipation of the drive device 10 can be improved.

According to the embodiment, the housing 20 includes the cover member 21 and the bracket 22, and the first fixing unit 21d is provided in the cover member 21. The stator core 41 contacts directly with the cover member 21. For this reason, the portion of the housing 20, with which the stator core 41 is in contact, is easily brought close to the first fixing unit 21d. Consequently, a heat dissipation path in the housing 20 can be shortened, and the heat generated in the coil 45 is easily released to the chassis of the traveling body through the stator core 41 and the housing 20. Thus, the heat dissipation of the drive device 10 can further be improved.

According to the embodiment, the first fixing unit 21d is located on the right side of the second motor bearing 72. For this reason, the first fixing unit 21d can be brought closer to the stator core 41. Consequently, the heat dissipation path from the stator core 41 to the chassis of the traveling body can further be shortened, and the heat dissipation of the drive device 10 can further be improved.

According to the embodiment, the inside of the housing 20 is sealed. In this case, air or the like cannot be fed into the housing 20, and a method for cooling the coil 45 by air cooling cannot be adopted. Thus, as described above, by bringing the stator core 41 into direct contact with the housing 20, a structure that allows the heat of the coil 45 to be released to the chassis of the traveling body is particularly useful in the case that the inside of the housing 20 is sealed as in the embodiment.

In the embodiment, the surface on the right side of a part of the core projection 42b among the plurality of core projections 42b contacts with the surface on the left side of the third fixing unit 22i. That is, in the embodiment, the stator core 41 also contacts directly with the bracket 22. Consequently, the heat of the coil 45 can also easily be released to the chassis of the traveling body from the path passing through the cover member 21 from the bracket 22. Thus, the heat dissipation of the drive device 10 can further be improved. The part of the core projection 42b among the plurality of core projections 42b is sandwiched between the cover cylinder unit 21b and the third fixing unit 22i in the axial direction X. The bracket 22 is positioned in the axial direction X with respect to the cover member 21 by bringing the third fixing unit 22i into contact with the core projection 42b. For example, three core projections 42b with which the third fixing unit 22i is in contact are provided.

The part of the core projection 42b of the plurality of core projections 42b is the second fixing unit 42d fixed to the cover member 21. The second fixing unit 42d fixed by tightening the screw 90 passed through the through-hole 42c from the right side in the cover member 21. In the embodiment, the screw 90 is tightened in the female screw hole provided in the end face on the right side of the cover cylinder 21b. The second fixing unit 42d is a core projection 42b different from the core projection 42b with which the third fixing unit 22i contacts, and, for example, three second fixing units 42d are provided.

Thus, the stator core 41 can be more reliably brought into contact with the cover member 21 by fixing the stator core 41 to the cover member 21 with the second fixing unit 42d interposed therebetween. Consequently, the heat dissipation of the drive device 10 is easily improved.

As described above, in the embodiment, the plurality of core projections 42b include the core projection 42b including the through-hole 42c through which the screw 91 for fixing the bracket 22 to the cover member 21 passes. The core projection 42b is different from the core projection 42b with which the third fixing unit 22i contacts and the core projection 42b that is the second fixing unit 42d, and, for example, six core projections 42b are provided.

The plurality of teeth 43 extend radially inward from the core back 42. Although not illustrated, the plurality of teeth 43 are arranged at equal intervals over the entire circumference along the circumferential direction. The insulator 44 is attached to the stator core 41. The plurality of coils 45 are attached to the stator core 41 with the insulator 44 interposed therebetween. More particularly, each of the plurality of coils 45 is attached to each of the plurality of teeth 43 with the insulator 44 interposed therebetween.

In the embodiment, the portion on the left side of the insulator 44 and the portion on the left side of the coil 45 are inserted in the cover cylinder 21b, and located at the same position as the portion on the right side of the first fixing unit 21d in the axial direction X. That is, the first fixing unit 21d includes the portion located at the same axial position as at least a part of the stator 40. For this reason, the first fixing unit 21d can be disposed at the position closer to the stator core 41. Consequently, the heat dissipation path from the stator core 41 to the chassis of the traveling body can further be shortened, and the heat dissipation of the drive device 10 can further be improved.

The circuit board 80 is accommodated in the housing 20 on the left side of the rotor main body 32. In the embodiment, the circuit board 80 is accommodated in the cover member 21. For this reason, the heat generated in the circuit board 80 is easily released from the cover member 21 to the chassis of the traveling body through the first fixing unit 21d. Consequently, the heat dissipation of the drive device 10 can further be improved.

Figure 11:
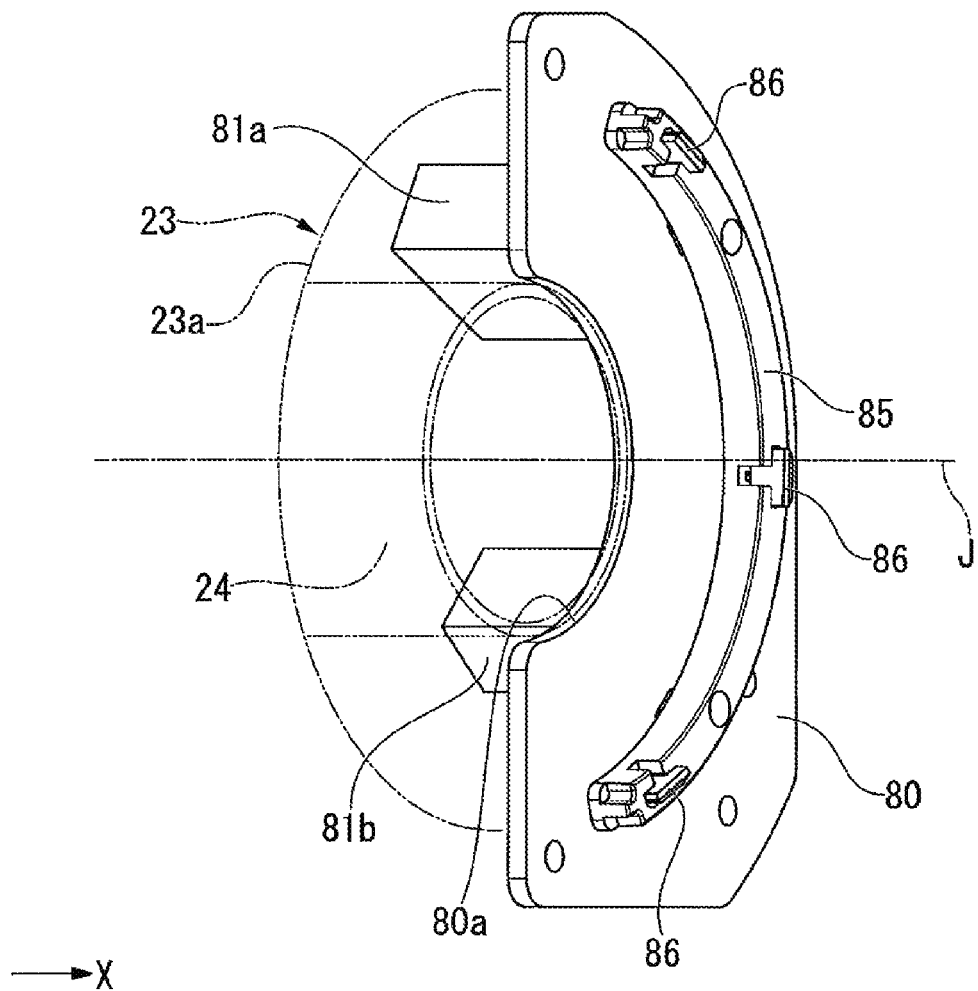
FIG. 11 is a perspective view illustrating a circuit board, a rotation sensor, and a connector of an exemplary embodiment of the present disclosure.

The circuit board 80 is located on the right side of the protruding cylinder 23. As illustrated in FIG. 11, the circuit board 80 has a plate shape in which a plate surface is oriented in the axial direction X. The circuit board 80 includes a recess 80a recessed on the radial outside. The end on the right side of the bearing holder 24 is fitted in the recess 80a. For example, the surface on the right side of the circuit board 80 is located at substantially the same position as the end face on the right side of the bearing holder 24 in the axial direction X.

The rotation sensor 86 is attached to the circuit board 80. In the embodiment, the rotation sensor 86 is attached to the surface on the right side of the circuit board 80 with an attachment member 85 interposed therebetween. The attachment member 85 extends circumferentially. The attachment member 85 is fixed to the surface on the right side of the circuit board 80. The rotation sensor 86 detects rotation of the rotor 30. For example, the rotation sensor 86 is a magnetic sensor. Examples of the magnetic sensor include a Hall element including a Hall IC and a magnetoresistive element. In this embodiment, for example, the rotation sensor 86 is the Hall element, and three rotation sensors 86 are provided. The three rotation sensors 86 are fixed to the attachment member 85, and disposed at intervals along the circumferential direction.

As illustrated in FIG. 2, the connector 81 protrudes leftward from the circuit board 80. The end on the left side of the connector 81 is located inside the protruding cylinder 23. The connector 81 is located radially inside the stator 40. For this reason, the connector 81 can be disposed close to the center axis J in the radial direction. Consequently, the outer diameter of the protruding cylinder 23 in which the end on the left side of the connector 81 is accommodated can be reduced as compared with the case that the connector 81 is disposed at the position overlapping the stator 40 in the axial direction X. Thus, according to the embodiment, the housing 20 can radially be downsized, and the drive device 10 can be downsized.

In the embodiment, the connector 81 is located radially inside the radially outside surface of the rotor main body 32. For this reason, the connector 81 can be disposed closer to the motor shaft 31 in the radial direction. Consequently, the outer diameter of the protruding cylinder 23 can further be reduced, and the housing 20 can be further downsized in the radial direction. In the embodiment, the connector 81 overlaps the rotor main body 32 on the radial inside of the stator 40 as viewed in the axial direction X.

In the embodiment, the connector 81 is located radially outside the second motor bearing 72. For this reason, the connector 81 can suitably be disposed away from the motor shaft 31 in the radial direction. Consequently, the connector 81 and the cable 83 connected to the connector 81 can be prevented from contacting with the motor shaft 31. The end on the left side of the connector 81 is located radially outside the bearing holder 24. That is, in the embodiment, the end on the left side of the connector 81 is radially located between the protruding cylinder 23 and the bearing holder 24. Consequently, the bearing holder 24 can further prevent the connector 81 and the cable 83 from contacting with the motor shaft 31.

According to the embodiment, the end on the right side of the bearing holder 24 is located on the right side of the surface on the left side of the circuit board 80. For this reason, the entire connector 81 protruding leftward from the surface on the left side of the circuit board 80 is located on the left side of the end on the right side of the bearing holder 24. Consequently, a radial distance between the entire connector 81 and the motor shaft 31 can be blocked by the bearing holder 24. Thus, the connector 81 and the cable 83 can further be prevented from contacting with the motor shaft 31.

The end on the left side of the connector 81 is located on the left side of the end on the right side of the extraction hole 23c. Consequently, the end on the right side of the bush 28 fitted in the extraction hole 23c is located on the right side of the end on the left side of the connector 81. For this reason, a part of the connector 81 and a part of the bush 28 can be disposed at the same position in the axial direction. Thus, the dimension in the axial direction X of the protruding cylinder 23 can be reduced, and the housing 20 can be downsized in the axial direction X. Consequently, the drive device 10 can further be downsized.

As illustrated in FIGS. 4 and 5, in the embodiment, for example, a connector 81a and a connector 81b are provided as connectors 81. In the embodiment, the connectors 81a, 81b have a quadrangular prism shape extending in the axial direction X. The connectors 81a, 81b are disposed with an interval in the circumferential direction.

The cable 83 is electrically connected to the circuit board 80 through the connector 81. As illustrated in FIG. 2, the cable 83 is extracted to the radial outside of the protruding cylinder 23 from the end on the left side of the connector 81 through the extraction hole 23c. As illustrated in FIGS. 4 and 5, the cable 83 includes a portion extending along the circumferential direction in the radial distance between the protruding cylinder 23 and the bearing holder 24.

In the embodiment, the cable 83 is extracted to the outside of the protruding cylinder 23 through the bush through-hole 28c. For this reason, the cable 83 can be supported by the inside surface of the bush through-hole 28c. Consequently, the cable 83 can stably be extracted to the outside of the protruding cylinder 23. In the embodiment, a cable 83a and a cable 83b are provided as two cables 83. The cable 83a is connected to the connector 81a. The cable 83b is connected to the connector 81b.

In the embodiment, the cable 83a is electrically connected to the rotation sensor 86 through the connector 81a. The cable 83b is electrically connected to the coil 45 through the connector 81b. The cables 83a, 83b are connected to an external device (not illustrated) outside the protruding cylinder 23. Consequently, the circuit board 80 is electrically connected to the external device through the cables 83a, 83b and the connectors 81a, 81b. The external device is a control device or the like that supplies power to the drive device 10.

As illustrated in FIG. 3, the planetary gear mechanism 50 includes a sun gear 31a, a carrier 51, a support shaft 53, a plurality of planetary gears 52, a plurality of planetary gear shafts 56, and an internal gear 54. The sun gear 31a is provided on the right side of the motor shaft 31. In the embodiment, the sun gear 31a is provided on the outer circumferential surface at the end on the right side of the motor shaft 31.

The carrier 51 is located on the right side of the bracket 22. The carrier 51 is fixed to the bracket 22. That is, the carrier 51 is fixed to the housing 20. The carrier 51 includes a second lid 51a, a plurality of legs 51d, a support cylinder 51b, a rib 51m, and a bearing support 51n.

As illustrated in FIG. 6, in the embodiment, the second lid 51a has a disc shape in which the plate surface is oriented in the axial direction X with the center axis J as the center. The second lid 51a is located on the right side of the planetary gear 52. The second lid 51a is located on the right side of the protrusion 25. As illustrated in FIG. 3, the second lid 51a includes a support shaft insertion hole 51k penetrating the second lid 51a in the axial direction X. For example, the support shaft insertion hole 51k is a circular shape centered on the center axis J. The support shaft 53 is passed through the support shaft insertion hole 51k.

The second lid 51a includes a second hole 51p recessed on the right side. In the embodiment, the second hole 51p penetrates the second lid 51a in the axial direction X. The second hole 51p is located radially outside the support shaft insertion hole 51k. As illustrated in FIG. 6, in the embodiment, the second hole 51p is located at the radially outer edge of the second lid 51a. For example, the second hole 51p has a circular shape. In the embodiment, three second holes 51p are made at equal intervals over an entire circumference along the circumferential direction. As illustrated in FIG. 3, the first holes 22d and the second holes 51p overlap with each other as viewed along the axial direction X. In the embodiment, for example, the inner diameter of the second hole 51p is larger than the inner diameter of the first hole 22d.

The plurality of legs 51d extend leftward from the second lid 51a. As illustrated in FIGS. 6 and 7, the plurality of legs 51d are disposed along the circumferential direction on the radial inside of the protrusion 25. In the embodiment, three legs 51d are provided at equal intervals over the entire circumference along the circumferential direction. The leg 51d includes a leg main body 51e and a leg fixing unit 51f.

The leg main body 51e extends linearly leftward from the radially outer edge of the second lid 51a. The leg fixing unit 51f protrudes radially outward from the leg main body 51e. The leg fixing unit 51f is located radially inside the protrusion 25. The plurality of leg fixing units 51f are fitted in the radially inside of the protrusion 25. As illustrated in FIG. 3, the surface on the left side of the leg fixing unit 51f contacts with the surface on the right side of the support 22g.

The leg fixing unit 51f includes an attachment hole 51j penetrating the leg fixing unit 51f in the axial direction X. The leg fixing unit 51f is fixed to the first lid 22a by fastening the screw 92 passed through the attachment hole 51j from the right side in the female screw hole 22e made in the first lid 22a. Consequently, the leg 51d is fixed to the bracket 22.

Figure 12:
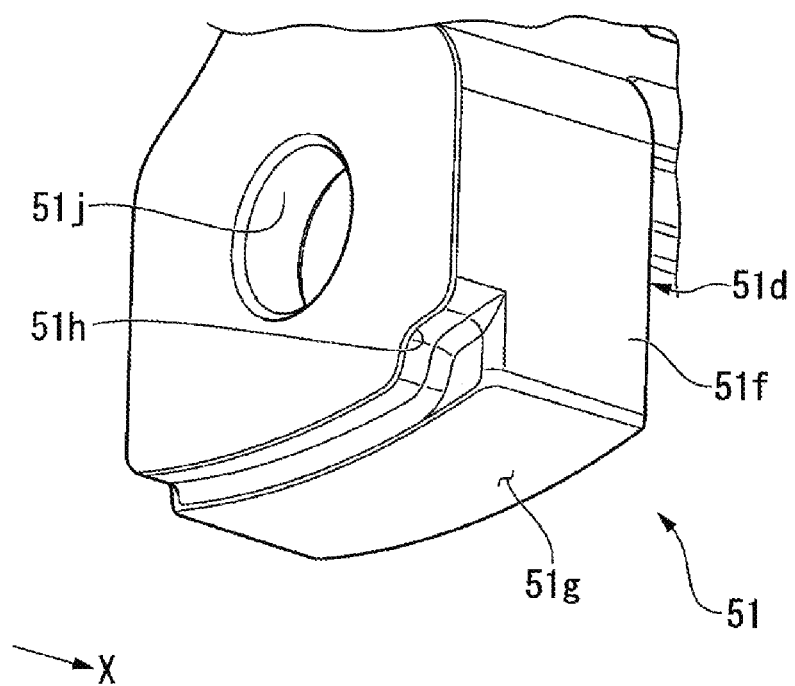
FIG. 12 is a perspective view illustrating a portion of a carrier of an exemplary embodiment of the present disclosure.

As illustrated in FIG. 12, the leg fixing unit 51f includes a positioning recess 51h. The positioning recess 51h is recessed rightward from the surface on the left side of the leg fixing unit 51f. The positioning recess 51h is located at the end on one side in the circumferential direction at the end on the radial outside of the leg fixing unit 51f. The positioning recess 51h is opened to one side in the circumferential direction. As illustrated in FIG. 7, in this embodiment, the positioning recess 51h is provided in two leg fixing units 51f among the three leg fixing units 51f. The positioning recesses 51h provided in the two leg fixing units 51f have directions opposite to each other in the circumferential direction.

Side faces oriented toward one side in the circumferential direction in the inside surfaces of the two positioning recesses 51h contact with the two positioning units 27. That is, the positioning unit 27 is opposed to one side in the circumferential direction of the leg 51d while contacting with one side in the circumferential direction of the leg 51d. Consequently, the positioning unit 27 is opposed to one side in the circumferential direction of the carrier 51 while contacting with one side in the circumferential direction of the carrier 51. Thus, the carrier 51 can circumferentially be positioned with respect to the bracket 22 by the positioning unit 27.

In the embodiment, the directions in which the two positioning recesses 51h are circumferentially opened are opposite to each other. Consequently, the positioning units 27 contact with the circumferential side faces of the two positioning recesses 51h, which allows the carrier 51 to be prevented from moving onto both sides in the circumferential direction with respect to the bracket 22.

As illustrated in FIG. 3, the support cylinder 51b has a cylindrical shape protruding leftward from the second lid 51a. The support cylinder 51b has a cylindrical shape centered on the center axis J. The support cylinder 51b is located radially inside the plurality of legs 51d. The end on the left side of the support cylinder 51b is located on the right side of the end on the left side of the leg 51d. A step 51c in which the inner diameter of the support cylinder 51b increases from the right side to the left side is provided in the inner circumferential surface of the support cylinder 51b.

The rib 51m connects the outer circumferential surface of the support cylinder 51b and the leg main body 51e. Although not illustrated, three ribs 51m are provided at equal intervals over the entire circumference along the circumferential direction. The bearing support 51n protrudes rightward from the circumferential edge of the support shaft insertion hole 51k in the surface on the right side of the second lid 51a. In the embodiment, the bearing support 51n has an annular shape centered on the center axis J.

As illustrated in FIG. 7, the carrier 51 includes a second curved surface 51g. In the embodiment, the second curved surface 51g is provided on each radially outside surface of the leg 51d. That is, in the embodiment, three second curved surfaces 51g are provided. In the embodiment, the second curved surface 51g is a radially outside surface of the leg fixing unit 51f. The second curved surface 51g is located radially inside the first curved surface 25b. The second curved surface 51g extends circumferentially as viewed in the axial direction X. The second curved surface 51g has an arc shape centered on the center axis J as viewed along the axial direction X. The second curved surface 51g contacts with the first curved surface 25b. For example, the second curved surface 51g is a cutting surface formed by cutting.

As illustrated in FIG. 3, the support shaft 53 is attached to the carrier 51. In the embodiment, the support shaft 53 has a columnar shape that extends in the axial direction X while being centered on the center axis J. The support shaft 53 is fitted in the support cylinder 51b. Although not illustrated, a D-cut unit is provided in the outer circumferential surface of the support shaft 53. Consequently, the support shaft 53 is prevented from rotating with respect to the carrier 51. The support shaft 53 is passed through the support shaft insertion hole 51k, and protrudes to the right side of the carrier 51. Consequently, the support shaft 53 extends rightward along the center axis J from the carrier 51.

The support shaft 53 includes a support-shaft main body 53a and an enlarged diameter unit 53b. The support-shaft main body 53a is passed through the support shaft insertion hole 51k, and protrudes to the right side of the carrier 51. The end on the right side of the support-shaft main body 53a protrudes to the right side of the output unit 60. A male screw is provided in the outer circumferential surface at the end on the right side of the support-shaft main body 53a. A nut 55 is fastened in the male screw of the support-shaft main body 53a.

The inner ring of the first bearing 73 is fitted in and fixed to a portion protruding onto the right side of the carrier 51 in the support-shaft main body 53a. Consequently, the first bearing 73 is attached to the support shaft 53. That is, in the embodiment, the first bearing 73 is attached to the planetary gear mechanism 50. The inner ring of the first bearing 73 attached to the support shaft 53 contacts with the bearing support 51n from the right side. The inner ring of the first bearing 73 is sandwiched between the nut 55 and the bearing support portion 51n in the axial direction X. Consequently, the first bearing 73 can firmly be fixed to the support shaft 53.

The support-shaft main body 53a includes a groove 53c recessed radially inward. Although not illustrated, the groove 53c has an annular shape, and is provided over the entire circumference of the support-shaft main body 53a. The groove 53c is provided in a portion to which the first bearing 73 is fixed in the outer circumferential surface of the support-shaft main body 53a. The annular first seal member 75 is fitted in the groove 53c. The first seal member 75 seals a gap between the inner circumferential surface of the inner ring of the first bearing 73 and the outer circumferential surface of the support-shaft main body 53a. That is, the first seal member 75 seals the gap between the first bearing 73 and the support shaft 53. Consequently, the moisture or the like can be prevented from entering the inside of the output unit 60. In the embodiment, for example, the first seal member 75 is an O-ring.

The enlarged diameter unit 53b is connected to the end on the left side of the support-shaft main body 53a. The enlarged diameter unit 53b is a portion in which the outer diameter of the enlarged diameter unit 53b is larger than the outer diameter of the support-shaft main body 53a. The enlarged diameter unit 53b is an end on the left side of the support shaft 53. The enlarged diameter unit 53b is located in the support cylinder 51b. The surface on the right side of the enlarged diameter unit 53b contacts with a step surface oriented toward the left side of the step 51c. Consequently, the enlarged diameter unit 53b is caught by the step 51c, so that the support shaft 53 can be prevented from falling out from the carrier 51 to the right side. The enlarged diameter unit 53b can be pressed against the step surface of the step 51c by fastening the nut 55. Consequently, the support shaft 53 can firmly be fixed to the carrier 51.

The plurality of planetary gears 52 are located radially inside the protrusion 25. The plurality of planetary gears 52 are arranged along the circumferential direction on the right side of the first lid 22a. As illustrated in FIGS. 6 and 7, in the embodiment, three planetary gears 52 are arranged at equal intervals over the entire circumference along the circumferential direction. The planetary gear 52 includes an inner cylinder 52a, an outer cylinder 52c, and an annular plate 52b.

The inner cylinder 52a has a cylindrical shape extending in the axial direction X. As illustrated in FIG. 3, the inner cylinder 52a is located between the first lid 22a and the second lid 51a in the axial direction X. The inside of the inner cylinder 52a overlaps the first hole 22d and the second hole 51p as viewed in the axial direction X. A portion on the right side of the inner cylinder 52a protrudes to the right side of the protrusion 25, and is located radially outside the support cylinder 51b. A gear portion is provided on the outer circumferential surface in a portion on the right side of the inner cylinder 52a.

The planetary gear shaft 56 is passed through the inner cylinder 52a. The planetary gear shaft 56 has a cylindrical shape extending in the axial direction X. The end on the left side of the planetary gear shaft 56 is fitted in the first hole 22d. The end on the right side of the planetary gear shaft 56 is fitted in the second hole 51p. Consequently, the planetary gear shaft 56 penetrates the planetary gear 52 in the axial direction X, and rotatably supports the planetary gear 52.

As illustrated in FIGS. 3 and 6, the outer cylinder 52c has a cylindrical shape centered on an axis parallel to the axial direction X. The outer cylinder 52c surrounds the portion on the left side of the inner cylinder 52a from the outside. A gear portion is provided in the outer circumferential surface of the outer cylinder 52c. The gear portion of the outer cylinder 52c engages with the sun gear 31a. The outer cylinder 52c is located radially inside the protrusion 25. As illustrated in FIG. 3, the outer circumferential surface of the outer cylinder 52c is disposed radially inside while separated away from the inner circumferential surface of the protrusion 25. Consequently, the planetary gear 52 and the protrusion 25 are radially opposed to each other with a gap G interposed therebetween. Thus, when the planetary gear 52 rotates, the inner circumferential surface of the protrusion 25 can be prevented from rubbing on the planetary gear 52. A lubricating oil can be held in the gap G, and the lubricating oil can be supplied to the gear portion of the outer cylinder 52c.

In the embodiment, the outer cylinder 52c is located at the same position as the protrusion 25 and the second bearing 74 in the axial direction X. That is, the planetary gear 52, the protrusion 25, and the second bearing 74 have portions located at the same position in the axial direction. Consequently, the drive device 10 can be downsized in the axial direction X.

The annular plate 52b has a plate shape in which the plate surface is oriented toward the axial direction X. The annular plate 52b has an annular shape as viewed in the axial direction X. The annular plate 52b connects the outer circumferential surface of the inner cylinder 52a and the inner circumferential surface of the outer cylinder 52c.

The internal gear 54 is located radially outside the portion on the right side of the carrier 51. The internal gear 54 has an annular shape surrounding the radial outside of the plurality of planetary gears 52. The internal gear 54 includes an internal-gear main body 54a and a fixing plate 54b. The internal-gear main body 54a has a cylindrical shape centered on the center axis J. A gear portion is provided on the outer circumferential surface of the internal-gear main body 54a. The gear portion of the internal-gear main body 54a engages with the gear portion provided in the outer circumferential surface of the inner cylinder 52a. Consequently, the internal gear 54 engages with the planetary gear 52.

The fixing plate 54b protrudes radially outward from the outer circumferential surface of the internal-gear main body 54a. The fixing plate 54b has a plate shape in which the plate surface is oriented toward the axial direction X. Although not illustrated, for example, the fixing plate 54b has an annular shape centered on the center axis J. The fixing plate 54b overlaps the annular plate 52b and the outer cylinder 52c as viewed in the axial direction X.

As illustrated in FIG. 2, the output unit 60 has a cylindrical shape surrounding the planetary gear mechanism 50 on the radial outside of the planetary gear mechanism 50. In the embodiment, the output unit 60 has a bottomed cylindrical shape that is opened onto the left side while centered on the center axis J. The output unit 60 includes an output lid 61, an output cylinder 62, and a wheel attaching unit 63.

The output lid 61 is fixed to the outer ring of the first bearing 73. The output lid 61 expands radially outward from the outer circumferential surface of the outer ring of the first bearing 73. The output lid 61 covers the right side of the planetary gear mechanism 50. The output lid 61 is rotatably supported by the support shaft 53 with the first bearing 73 interposed therebetween. Consequently, the first bearing 73 supports the portion on the right side of the output unit 60. The first bearing 73 is located radially inside the output lid 61. That is, the first bearing 73 is located radially inside the output unit 60. As illustrated in FIG. 3, the fixing plate 54b is fixed to the surface on the left side of the output lid 61 by a screw 93. Consequently, the output unit 60 is fixed to the internal gear 54.

As illustrated in FIG. 2, the output cylinder 62 has a cylindrical shape extending leftward from the radially outer edge of the output lid 61. The end on the left side of the output cylinder 62 is located radially outside the protrusion 25. The outer circumferential surface of the outer ring of the second bearing 74 is fixed to the inner circumferential surface at the end on the left side of the output cylinder 62. The end on the left side of the output cylinder 62 is rotatably supported by the protrusion 25 with the second bearing 74 interposed therebetween. Consequently, the second bearing 74 supports the portion on the left side of the output unit 60.

In this way, according to the embodiment, the portion on the right side of the output unit 60 and the portion on the left side of the output unit 60 can be supported by the first bearing 73 and the second bearing 74. In the embodiment, the drive device 10 is fixed to the chassis of the traveling body while the first fixing unit 21d provided on the left side is interposed therebetween. For this reason, a load tends to be applied to the output unit 60 disposed on the right side of the drive device 10. On the other hand, according to the embodiment, the load applied to the output unit 60 on both axial sides in the axial direction can be received by the first bearing 73 and the second bearing 74 in a dispersed manner. Thus, the output unit 60 can be prevented from being inclined with respect to the axial direction X. Consequently, the wear of the bearings supporting the output unit 60 and the gears of the planetary gear mechanism 50 that is the reduction mechanism can further be prevented.

According to the embodiment, the first bearing 73 is attached to the planetary gear mechanism 50, and the second bearing is attached to the housing 20. For this reason, the first bearing 73 and the second bearing 74 are easily disposed while separated away from each other in the axial direction X, and both sides in the axial direction of the output unit 60 is easily supported by the first bearing 73 and the second bearing 74. Consequently, the load applied to the output unit 60 can more favorably be received in a dispersed manner. Thus, the wear of the bearings supporting the output unit 60 and the gears of the planetary gear mechanism 50 that is the reduction mechanism can further be prevented.

According to the embodiment, the planetary gear mechanism 50 is a speed reduction mechanism that decelerates the rotation of the motor shaft 31. For this reason, the number of gears included in the speed reduction mechanism tends to be increased. Thus, the effect that can prevent the wear of each gear of the speed reduction mechanism is more usefully obtained.

The second bearing 74 is located radially inside the output cylinder 62. That is, the second bearing 74 is located radially inside the output unit 60. In the embodiment, the second bearing 74 is located radially outside the first bearing 73.

The wheel attaching unit 63 is a portion to which a wheel (not illustrated) is attached. As illustrated in FIG. 1, the wheel attaching unit 63 protrudes rightward from the radially outer edge of the output lid 61. For example, the wheel attaching unit 63 has a trapezoidal columnar shape. A plurality of wheel attaching units 63 are provided. The plurality of wheel attaching units 63 are arranged at equal intervals over the entire circumference along the circumferential direction. In the embodiment, for example, six wheel attaching units 63 are provided. As illustrated in FIG. 2, the wheel attaching unit 63 is located at a position overlapping the second bearing 74 as viewed in the axial direction X. For this reason, the radial distance from the wheel attaching unit 63 to the second bearing 74 can be shortened as compared with the case that the wheel attaching unit 63 is located radially outside the second bearing 74. Consequently, moment applied to the second bearing 74 by the load received from the wheel by the wheel attaching unit 63 can be decreased. Thus, the load applied to the second bearing 74 can be reduced.

According to the embodiment, the second bearing 74 is located radially outside the first bearing 73. In such cases, a larger load tends to be applied to the second bearing 74 as compared with the first bearing 73. For this reason, in the case of such configurations, the effect that can reduce the load applied to the second bearing 74 is obtained more effectively.

The wheel attaching unit 63 includes a female screw hole 63a recessed on the left side. The female screw hole 63a is a hole including a bottom. In the embodiment, spokes of the wheel (not illustrated) are fixed to the respective wheel attaching units 63. The spokes are fixed to the wheel attaching unit 63 by the screw fastened in the female screw hole 63a. In the embodiment, the output unit 60 corresponds to a hub of the wheel.

When the motor 11 is driven to rotate the motor shaft 31, the plurality of planetary gears 52 engaging with the sun gear 31a rotates about the axis of each planetary gear shaft 56. The plurality of planetary gears 52 rotate, whereby the internal gear 54 engaging with the planetary gear 52 rotates about the center axis J. Consequently, the output unit 60 fixed to the internal gear 54 rotates about the center axis J. In this way, the rotation of the motor shaft 31 is decelerated and transmitted to the output unit 60.

According to the embodiment, the first curved surface 25b of the protrusion 25 and the second curved surface 51g of the carrier 51 extend in the circumferential direction as viewed in the axial direction X, and come into contact with each other. Consequently, the protrusion 25 and the carrier 51 can radially be positioned with respect to each other, and the bracket 22 and the carrier 51 can be fixed with high axial accuracy. Thus, the support shaft 53 attached to the carrier 51 can be disposed with high axial accuracy with respect to the bracket 22. For this reason, the first bearing 73 attached to the support shaft 53 and the second bearing 74 attached to the bracket 22 can be disposed with high axial accuracy. As described above, the axial accuracy of the output unit 60 supported to be rotatable about the center axis J by the first bearing 73 and the second bearing 74 can be improved.

According to the embodiment, the second bearing 74 is attached to the protrusion 25 including the first curved surface 25b. For this reason, as compared with the case that the second bearing 74 is attached to another portion of the bracket 22, the center of the second bearing 74 can easily be matched with the center axis J. Consequently, the first bearing 73 and the second bearing 74 can be disposed with higher axial accuracy. Thus, the axial accuracy of the output unit 60 can be further improved.

According to the embodiment, the first curved surface 25b has a circular shape as viewed in the axial direction X. For this reason, an area of the first curved surface 25b can be enlarged, and an area of the second curved surface 51g contacting with the first curved surface 25b can be enlarged. Consequently, the bracket 22 and the carrier 51 can be fixed with higher axial accuracy. Thus, the first bearing 73 and the second bearing 74 can be disposed with higher axial accuracy, and the axial accuracy of the output unit 60 can further be improved.

According to the embodiment, each of the radially outside surfaces of the plurality of legs 51d arranged along the circumferential direction has the second curved surface 51g. For this reason, the first curved surface 25b and the plurality of second curved surfaces 51g can be brought into contact with each other by fitting the plurality of legs 51d in the cylindrical protrusion 25 in which the inner circumferential surface is the first curved surface 25b. Consequently, the carrier 51 can be prevented from moving radially with respect to the protrusion 25, and the first curved surface 25b and the second curved surface 51g can be prevented from being separated from each other. Thus, the bracket 22 and the carrier 51 can be fixed with higher axial accuracy.

According to the embodiment, the bracket 22 includes the positioning unit 27 that is opposed to one side in the circumferential direction of the carrier 51 while contacting with one side in the circumferential direction of the carrier 51. For this reason, as described above, the carrier 51 can circumferentially be positioned with respect to the bracket 22. Consequently, the circumferential positions of the first hole 22d of the bracket 22 and the second hole 51p of the carrier 51 can accurately be matched with each other. As described above, in the embodiment, the bracket 22 and the carrier 51 can be fixed with high axial accuracy. For this reason, the first hole 22d and the second hole 51p can be accurately disposed while overlapped with each other in the axial direction X. Consequently, the planetary gear shaft 56 in which the ends on both sides in the axial direction are fitted in the first hole 22d and the second hole 51p can be prevented from being inclined with respect to the axial direction X. Thus, the inclination of the planetary gear 52 can be prevented, and wear of the gear portion of the planetary gear 52 and the gear portion engaging with the gear portion of the planetary gear 52 can be prevented.

According to the embodiment, the positioning unit 27 contacts with one side in the circumferential direction of the leg 51d including the second curved surface 51g. For this reason, both the radial position of the carrier 51 with respect to the bracket 22 and the circumferential position of the carrier 51 with respect to the bracket 22 can be decided by aligning the position of the leg 51d. Thus, the positioning of the carrier 51 can easily be performed with respect to the bracket 22.

According to the embodiment, the first curved surface 25b and the second curved surface 51g are the cutting surfaces. For this reason, the surface accuracy of the first curved surface 25b and the surface accuracy of the second curved surface 51g can relatively be enhanced. Consequently, the bracket 22 and the carrier 51 can be disposed with higher axial accuracy by bringing the first curved surface 25b and the second curved surface 51g into contact with each other.

In the embodiment, the first curved surface 25b and the second curved surface 51g are produced by one chuck processing in which the bracket 22 and the carrier 51 are simultaneously chucked with respect to a lathe. Consequently, a center of curvature of the first curved surface 25b and a curvature center of the second curved surface 51g can accurately be matched with each other. Thus, the bracket 22 and the carrier 51 can be disposed with higher axial accuracy by bringing the first curved surface 25b and the second curved surface 51g into contact with each other.

The present disclosure is not limited to the above embodiment, but other configurations may be adopted. The first curved surface and the second curved surface are not particularly limited as long as the first curved surface and the second curved surface extend circumferentially as viewed in the axial direction X while contacting with each other. The first curved surface may not have the circular shape as viewed in the axial direction X. A plurality of first curved surfaces may be provided along the circumferential direction. In this case, a plurality of protrusions may be provided along the circumferential direction. Only one second curved surface may be provided. The second curved surface may have a circular shape as viewed along the axial direction X. The first curved surface and the second curved surface may not be the cutting surfaces. Only one positioning unit may be provided. The positioning unit may not be provided.

The stator core may contact directly with the housing at a portion other than the second fixing unit. The core back body may contact directly with the housing. The stator core may contact direct with only the cover member or only the bracket. The stator core may not contact directly with the housing, but may contact indirectly with the housing.

Only one connector may be provided, or at least three connectors may be provided. The connector may not include the portion having the same axial position as the extraction hole. The connector and the rotation sensor may not be provided. The bush may not be provided. The rubber cover may not be provided.

The wheel attaching unit may be located radially inside the second bearing. In this case, the moment applied to the second bearing by the load received from the wheel by the wheel attaching unit can be reduced, and the load applied to the second bearing can be reduced. The internal gear and the output unit may not be separate members, but may be a part of the same single member. The output unit may not constitute a part of the wheel.

The inside of the housing may not be sealed. The second bearing may be provided in a portion other than the protrusion as long as the second bearing is attached to the bracket. For example, the second bearing may be attached to the bracket cylinder.

Figure 13:
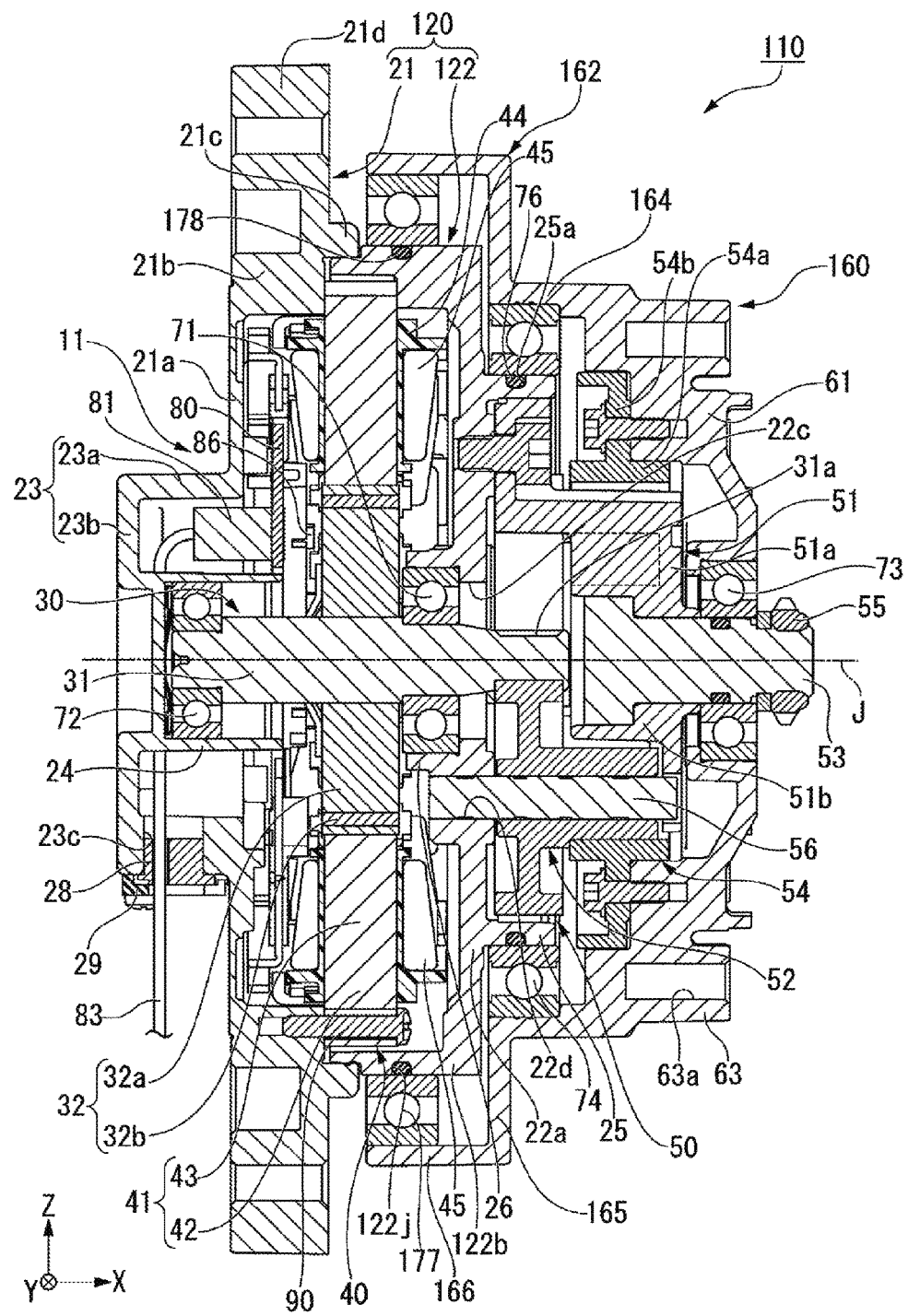
FIG. 13 is a sectional view illustrating a drive device of an exemplary embodiment of the present disclosure.

A third bearing supporting the output unit may be provided like a drive device 110 in FIG. 13. As illustrated in FIG. 13, the drive device 110 further includes a third bearing 177 and a third seal member 178. For example, the third bearing 177 is a ball bearing. The third bearing 177 is attached to a bracket 122. More particularly, the third bearing 177 is fitted in and fixed to the outer circumferential surface of a bracket cylinder 122b. That is, the third bearing 177 is fixed to the radially outside surface of a housing 120. The third bearing 177 is located on the left side of the second bearing 74. The third bearing 177 is located radially outside the second bearing 74. The third bearing 177 overlaps the stator 40 as viewed in the radial direction.

In the drive device 110, the bracket cylinder 122b includes a groove 122j recessed radially inward from the outer circumferential surface of the bracket cylinder 122b. Although not illustrated, the groove 122j has an annular shape, and is provided over the entire circumference of the outer circumferential surface of the bracket cylinder 122b. The groove 122j is provided in a portion to which the third bearing 177 is fixed in the outer circumferential surface of the bracket cylinder 122b. The annular third seal member 178 is fitted in the groove 122j. The third seal member 178 seals a gap between the inner circumferential surface of the inner ring of the third bearing 177 and the outer circumferential surface of the bracket cylinder 122b. That is, the third seal member 178 seals the gap between the third bearing 177 and the bracket 122. For this reason, the moisture or the like can be prevented from entering the inside of an output unit 160. For example, the third seal member 178 is an O ring.

In the drive device 110, the output cylinder 162 of the output unit 160 includes a first portion 164, a second portion 165, and a third portion 166. The first portion 164 is similar to the output cylinder 62 in FIG. 2. The second portion 165 extends radially outward from the left end of the first portion 164. The second portion 165 has a plate shape in which the plate surface is oriented toward the axial direction X, and is an annular shape centered on the center axis J. The third portion 166 has a cylindrical shape extending leftward from the radially outer circumferential edge of the second portion 165. The third portion 166 is located radially outside the bracket cylinder 122b.

The outer circumferential surface of the outer ring of the third bearing 177 is fixed to the inner circumferential surface at the end on the left side of the third portion 166. The end on the left side of the third portion 166 is rotatably supported by the bracket cylinder 122b with the third bearing 177 interposed therebetween. Consequently, the output unit 60 is supported by the third bearing 177 to be rotatable about the center axis J. Thus, the load applied to the output unit 160 can dispersedly be received by the first bearing 73, the second bearing 74, and the third bearing 177. For this reason, the wear of the bearings supporting the output unit 160 and the gears of the planetary gear mechanism 50 that is the reduction mechanism can further be prevented.

The second bearing 74 may not be provided in the drive device 110 in FIG. 13. In this case, the third bearing 177 corresponds to the second bearing. The third bearing 177 as the second bearing overlaps the stator 40 as viewed in the radial direction. For this reason, the third bearing 177 as the second bearing can be disposed further away from the first bearing 73, and the load applied to the output unit 160 can more properly be received in a dispersed manner.

The drive device of the above embodiment is not particularly limited as long as the application is a drive device that rotates the wheel. The traveling body on which the drive device is mounted is not particularly limited as long as the traveling body is a traveling body including the wheel. Examples of the traveling body include a bicycle, an automobile, and a wheelchair. A type of the wheel is not particularly limited. Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device that rotates a wheel, the drive device comprising:
   a motor including a motor shaft disposed along a center axis;
   a planetary gear mechanism connected to one side in an axial direction of the motor shaft; and
   an output unit to which rotation of the motor shaft is transmitted through the planetary gear mechanism;
   wherein the motor includes:
   a rotor including the motor shaft;
   a stator opposed to the rotor in a radial direction with a gap interposed therebetween; and
   a bracket including a first lid covering one side in the axial direction of the stator;
   the planetary gear mechanism includes:

a sun gear provided at a portion on one side in the axial direction of the motor shaft;

a plurality of planetary gears that are arranged along a circumferential direction on one side in the axial direction of the first lid to engage with the sun gear;

an annular internal gear that surrounds a radial outer periphery of the plurality of planetary gears to engage with the planetary gears;

a carrier including a second lid located on one side in the axial direction of the planetary gear, the carrier being fixed to the bracket; and a support shaft that is attached to the carrier to extend from the carrier to one side in the axial direction along the center axis;

the output unit is supported to be rotatable about the center axis by a first bearing attached to the support shaft and a second bearing attached to the bracket, and fixed to the internal gear;

the bracket includes a protrusion protruding from the first lid to one side in the axial direction;

a radially inside surface of the protrusion includes a first curved surface that extends in the circumferential direction as viewed along the axial direction;

the carrier includes a second curved surface located on a radial inside of the first curved surface; and the second curved surface extends in the circumferential direction as viewed along the axial direction, and contacts with the first curved surface.

2. The drive device according to claim 1, wherein the second bearing is attached to the protrusion.

3. The drive device according to claim 1, wherein the protrusion has a cylindrical shape; and the first curved surface has a circular shape as viewed along the axial direction.

4. The drive device according to claim 3, wherein the carrier includes a plurality of legs extending from the second lid to another side in the axial direction;

the plurality of legs are fixed to the bracket and disposed along the circumferential direction on a radial inside of the protrusion; and each of radially outside surfaces of the plurality of legs includes the second curved surface.

5. The drive device according to claim 1, wherein the first lid includes a first hole recessed on the other side in the axial direction;

the second lid includes a second hole recessed on one side in the axial direction;

the first hole and the second hole overlap each other as seen along the axial direction;

the planetary gear mechanism includes a planetary gear shaft that penetrates the planetary gear in the axial direction to rotatably support the planetary gear;

an end on one side in the axial direction of the planetary gear shaft is fitted in the second hole;

an end on the other side in the axial direction of the planetary gear shaft is fitted in the first hole; and the bracket includes a positioning unit that is opposed to one side in the circumferential direction of the carrier while contacting with one side in the circumferential direction of the carrier.

6. The drive device according to claim 5, wherein the carrier includes a leg extending from the second lid to the other side in the axial direction;

the leg is fixed to the bracket;

the radially outside surface of the leg includes the second curved surface; and the positioning unit is located radially inside of the protrusion, and opposed to one side in the circumferential direction of the leg while contacting with one side in the circumferential direction of the leg.

7. The drive device according to claim 1, wherein the planetary gear is located radially inside of the protrusion; and the planetary gear and the protrusion are opposed to each other in the radial direction with a gap interposed therebetween.

8. The drive device according to claim 1, wherein the planetary gear, the protrusion, and the second bearing include portions located at an identical position in the axial direction.

9. The drive device according to claim 1, wherein the bracket includes a holder that holds a motor bearing rotatably supporting the motor shaft on the other side in the axial direction of the planetary gear; and the motor bearing overlaps with the planetary gear as viewed along the axial direction.

10. The drive device according to claim 1, wherein the first curved surface and the second curved surface are cutting surfaces.

* * * * *